(12) United States Patent
Koide

(10) Patent No.: US 6,786,257 B1
(45) Date of Patent: Sep. 7, 2004

(54) PNEUMATIC TIRE INCLUDING TWISTED SIPE

(75) Inventor: Masafumi Koide, Saitama-ken (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 09/601,078

(22) PCT Filed: Jul. 28, 1999

(86) PCT No.: PCT/JP99/04049
§ 371 (c)(1),
(2), (4) Date: Jul. 20, 2000

(87) PCT Pub. No.: WO00/30876
PCT Pub. Date: Jun. 2, 2000

(30) Foreign Application Priority Data

Nov. 20, 1998 (JP) .......................................... 10-331556

(51) Int. Cl.$^7$ .......................... B60C 11/11; B60C 11/12; B60C 107/00
(52) U.S. Cl. .............................. 152/209.1; 152/209.23; 152/902; 152/DIG. 3
(58) Field of Search ....................... 152/209.18, 209.23, 152/DIG. 3, 902, 209.1, 526

(56) References Cited

U.S. PATENT DOCUMENTS

| | | | | |
|---|---|---|---|---|
| 2,339,558 A | * | 1/1944 | Hale | |
| 4,566,514 A | * | 1/1986 | Mauk et al. | |
| 4,598,747 A | * | 7/1986 | Flechtner | |
| 4,723,584 A | * | 2/1988 | Yamaguchi et al. | |
| 4,819,704 A | * | 4/1989 | Misawa et al. | |
| 4,856,571 A | * | 8/1989 | Collette et al. | |
| 5,238,038 A | * | 8/1993 | Glover et al. | |
| 5,669,993 A | * | 9/1997 | Moseley et al. | |
| 5,783,002 A | * | 7/1998 | Lagnier | |

FOREIGN PATENT DOCUMENTS

| | | | |
|---|---|---|---|
| DE | 41 07 547 A1 | | 9/1991 |
| EP | 605849 | * | 7/1994 |
| EP | 0 696 521 A1 | | 2/1996 |
| EP | 0 881 103 A1 | | 12/1998 |
| EP | 0 963864 A2 | | 12/1999 |
| EP | 1072445 | * | 1/2001 |
| JP | 60-45405 | | 3/1985 |
| JP | 62-286805 | * | 12/1987 |
| JP | 2-299910 | * | 12/1990 |
| JP | 4-100706 | * | 4/1992 |
| JP | 9-323510 | | 12/1997 |
| JP | 10-138715 | * | 5/1998 |
| WO | WO 96/01190 | * | 1/1996 |

OTHER PUBLICATIONS

Blow, Rubber Technology and Manufacture, pp. 345–356, 1971.*
Machine Translation for Japan 9–323510.*
Translation for Japan 62–286805.*
Translation for WO 96/01190.*
Patent Abstracts of Japan, vol. 1999, No. 14, Sep. 7, 1999, 11240314.

* cited by examiner

Primary Examiner—Steven D. Maki
(74) Attorney, Agent, or Firm—Sughrue Mion, PLLC

(57) ABSTRACT

A pneumatic tire.

In a block 18 formed on a tread surface, a sipe 24 which is twisted at a predetermined angle from a surface portion 28 toward a bottom portion 30 is provided. Due to ground contact pressure exerted on a contact patch area 26, small blocks 18a to 18d rotate, so that adjacent small blocks abut each other with a strong force. As a result, leaning of the small blocks 18a to 18d is suppressed, and a contact patch area area on the contact patch area 26 increases, so that performance on ice and snow improves. Moreover, due to rotation of the small blocks 18a to 18d, a torque (SAT) for restoring the small block to an original shape is generated, so that SAT generated by steel cords can be suppressed.

7 Claims, 24 Drawing Sheets

FIG.20

| | COMPARATIVE EXAMPLE 1 | EXAMPLE1 | EXAMPLE2 | EXAMPLE3 | EXAMPLE4 | EXAMPLE5 | EXAMPLE6 |
|---|---|---|---|---|---|---|---|
| SAT | 0 | 0.0030 | 0.0032 | 0.0031 | 0.0031 | 0.0150 | -0.0070 |

| | COMPARATIVE EXAMPLE 2 | EXAMPLE7 | EXAMPLE8 | EXAMPLE9 |
|---|---|---|---|---|
| SAT | 0 | 0.0070 | 0.0190 | 0.0050 |

FIG. 21

| | COMPARATIVE EXAMPLE 1 | EXAMPLE 1 | EXAMPLE 2 | EXAMPLE 3 | EXAMPLE 4 | EXAMPLE 5 | EXAMPLE 6 |
|---|---|---|---|---|---|---|---|
| DEFORMATION AMOUNT | 3.85 | 3.02 | 2.98 | 2.01 | 1.98 | 2.44 | 2.11 |

| | COMPARATIVE EXAMPLE 2 | EXAMPLE 7 | EXAMPLE 8 | EXAMPLE 9 |
|---|---|---|---|---|
| DEFORMATION AMOUNT | 1.89 | 1.54 | 1.66 | 1.33 |

FIG.22

| | COMPARATIVE EXAMPLE 1 | EXAMPLE 1 | EXAMPLE 2 | EXAMPLE 3 | EXAMPLE 4 | EXAMPLE 5 | EXAMPLE 6 |
|---|---|---|---|---|---|---|---|
| ON-ICE BRAKING PERFORMANCE | 100 | 102 | 107 | 103 | 111 | 103 | 105 |

| | COMPARATIVE EXAMPLE 2 | EXAMPLE 7 | EXAMPLE 8 | EXAMPLE 9 |
|---|---|---|---|---|
| ON-ICE BRAKING PERFORMANCE | 95 | 98 | 99 | 102 |

PNEUMATIC TIRE INCLUDING TWISTED SIPE

TECHNICAL FIELD

The present invention relates to a pneumatic tire which exhibits an excellent performance on ice and snow.

BACKGROUND TECHNOLOGY

Conventionally, a pneumatic tire which is provided with a plurality of blocks on a tread surface, wherein the blocks are defined by main grooves formed in the tire circumferential direction, lug grooves formed in the tire transverse direction and the like has existed. By providing blocks on a tread surface in such a manner, a pneumatic tire ensures favorable braking and traction force, steering stability and the like.

Also, improvement in performance on ice and snow and a wet property has been attempted by providing sipes in the blocks to increase an edge length and to increase gripping force.

Further, under the tread surface of the pneumatic tire formed in this way, reinforcing layers in which a number of steel cords are provided parallel to each other are laminated in order to strengthen stiffness of the tread.

In the pneumatic tire structured as described above, the contact patch area side of each block is divided by sipes into a plurality of small blocks. When the tire rotates, each of the small blocks tends to lean backward due to the frictional force exerted between itself and the road surface. When the degree of leaning becomes large, a contact patch area area of the contact patch area decreases, so that there is a possibility that the performance on ice and snow may deteriorate.

However, the small blocks are compressed in a height direction (the direction oriented toward the tire axis from the contact patch area) by ground contact pressure from the contact patch area and expand in a cross direction (the direction perpendicular to the height direction). As a result, the small blocks abut the adjacent small blocks across the sipes, so that leaning thereof is suppressed to a certain extent.

However, if the sipes are formed straight in the sipe depth direction, deformation of the small blocks due to ground contact is not capable enough of causing the small blocks to contact the adjacent small blocks with sufficient force. Accordingly, leaning suppression is weak and thus it can hardly be said that contact patch area area of the contact patch area is sufficiently ensured.

Further, a plurality of steel cords disposed in each of the reinforcing layers are provided parallel to each other and inclined at a predetermined angle with respect to the tire circumferential direction. Thus, there has been a problem in that when a vehicle on which the pneumatic tires are actually fitted is driven, the steel cords provided in the reinforcing layer closest to the tread surface side lean toward the tire circumferential direction, thereby generating a force to restore the tire distorted by ground contact pressure to the original shape (Self Alignment Torque, referred to as SAT hereinafter).

In view of the above-described circumstances, an object of the present invention is to provide a pneumatic tire which exhibits an excellent performance on ice and snow by suppressing leaning of blocks having sipes, and which suppresses SAT.

DISCLOSURE OF THE INVENTION

A first aspect of the present invention is a pneumatic tire comprising: a plurality of reinforcing layers in which cords, which are inclined at a predetermined angle with respect to a tire circumferential direction, are provided parallel to each other; a tread provided on a top of the reinforcing layers which are laminated; and a block-shaped land portion having a sipe, the block-shaped land portion being defined on a tread surface by main grooves formed in the tire circumferential direction and by lug grooves formed in a direction intersecting the main grooves; wherein the sipe is shaped so as to be twisted around a first central axis of twisting extending in a tire radial direction in the block-shaped land portion and a second central axis of twisting extending substantially in a tire transverse direction, a position P1 of the first central axis of twisting in a region between one end surface of the block-shaped land portion and another end surface in the tire transverse direction and a position P2 of the second central axis of twisting in a region between a contact patch area and a bottom of the sipe in the tire radial direction being within ranges satisfying the following relational expressions:

$$0.2\,W \leq P1 \leq 0.8\,W$$

$$0.2\,F \leq P2 \leq 0.6\,F$$

wherein P1, P2 represent the position of the first and second central axes of twisting respectively; W represents a distance from the one end surface to the other end surface of the block-shaped land portion in the tire transverse direction; and F represents a distance from the contact patch area to the bottom of the sipe in the tire radial direction.

In the first aspect of the invention, since the sipe is shaped so as to be twisted around the first central axis of twisting extending in the tire radial direction and the second central axis of twisting extending substantially in the tire transverse direction, the block-shaped land portion is compressed in a height direction due to ground contact pressure and expands in a cross direction, and as a result, small blocks divided by the sipe abut each other. Moreover, since the sipe is twisted, the small blocks abut each other not only due to a force exerted in the tire circumferential direction (the tire rotation direction), but also due to forces exerted from other directions. Further, since the small blocks perform a rotational motion due to ground contact pressure, the adjacent small blocks abut each other with a strong force.

Moreover, the position P1 of the first central axis of twisting is within the range of $0.2\,W \leq P1 \leq 0.8\,W$ with respect to a distance W (referred to as width W hereinafter) from one end surface to the other end surface of the block-shaped land portion in the tire transverse direction, and the position P2 of the second central axis of twisting is within the range of $0.2\,F \leq P2 \leq 0.6\,F$ with respect to a distance F (referred to as sipe depth F hereinafter) from the contact patch area to the bottom of the sipe in the tire radial direction, and because of this positioning, stiffness of the small blocks increases further and leaning thereof is suppressed compared to structures with positioning in which the first central axis of twisting and the second central axis of twisting are located at positions not within the above-mentioned ranges (see FIG. 24 and FIG. 25).

In this way, the small blocks abut each other with a strong force due to the sipes being formed with a twist, and stiffness of the small blocks can be increased by positioning the first central axis of twisting and the second central axis of twisting of the sipe within the predetermined ranges. Accordingly, leaning can be suppressed with certainty. As a result, a contact patch area area on the contact patch area of the small blocks increases, and performance on ice and snow improves.

Further, when ground contact pressure acts on the contact patch area of the block-shaped land portion, the block-shaped land portion is compressed in the height direction, so that each of the small blocks, while guided by the sipe, rotationally deforms in a direction in which the sipe is further twisted. Due to this deformation, an SAT (a torque for restoring the small blocks to the original shapes) exerted in a direction opposite to the twisting direction of the sipe is generated on each of the small blocks.

Thus, by forming the block-shaped land portion, in which the sipes are twisted in an appropriate direction, on the tread surface, the SAT generated by an inclination, relative to the tire circumferential direction, of the cords which form an outermost layer of the reinforcing layers is reduced. That is, the SAT due to the cords can be suppressed by the SAT generated at the block-shaped land portion.

Accordingly, a favorable steering stability on icy and snowy roads and the like can be obtained with a vehicle to which such pneumatic tires are mounted.

A second aspect is a pneumatic tire comprising: a plurality of reinforcing layers in which cords, which are inclined at a predetermined angle with respect to a tire circumferential direction, are provided parallel to each other; a tread provided on a top of the reinforcing layers which are laminated; and a block-shaped land portion having a sipe, the block-shaped land portion being defined on a tread surface by main grooves formed in the tire circumferential direction and by lug grooves formed in a direction intersecting with the main grooves; wherein the sipe is shaped so as to have a first protruding portion protruding in a first direction with respect to a virtual central plane and a second protruding portion protruding in a second direction opposite the first direction across the virtual central plane, the sipe including a surface portion exposed on a contact patch area of the block-shaped land portion and a bottom portion formed in a bottom of the sipe, the virtual central plane being twisted from the surface portion toward the bottom portion.

In the second aspect of the invention, since the sipe has a structure twisted from the surface portion toward the bottom portion, when the block-shaped land portion is compressed in a height direction due to ground contact pressure and expands in a cross direction, small blocks divided by the sipe abut each other. Moreover, since the sipe (the virtual central plane thereof) is twisted, the small blocks abut each other not only due to a force exerted in the tire circumferential direction (the tire rotation direction), but also due to a force exerted from other directions. Further, since the small blocks perform a rotational motion due to ground contact pressure, the adjacent small blocks abut each other with a strong force.

In this way, since the sipe is formed with a twist, the small blocks abut each other with a strong force, so that leaning is suppressed with certainty. As a result, a contact patch area area on the contact patch area of the small blocks increases, and the performance on ice and snow improves.

In particular, since the sipe is not only twisted, but also formed with the first protruding portion and the second protruding portion, that is, with a shape having recessed and protruding portions across the virtual central plane, the deformation of the block-shaped land portion due to ground contact pressure suffices to cause the small blocks to abut each other with a stronger force and increase contact area. Thus, leaning is suppressed further and a contact patch area area on the contact patch area increases, so that the performance on ice and snow improves even more.

Moreover, when ground contact pressure is exerted on the contact patch area of the block-shaped land portion, the block-shaped land portion is compressed in the height direction, so that each of the small blocks, while guided by the sipe, deforms in a direction in which the sipe (the virtual central plane thereof) is further twisted. Due to this deformation, SAT (a torque for restoring the small blocks to their original shapes) exerted in a direction opposite to the twisting direction of the sipes is generated on each of the small blocks.

Thus, by forming the block-shaped land portion, in which the sipes are twisted in an appropriate direction, on the tread surface, the SAT generated by an inclination, relative to the tire circumferential direction, of cords which form an outermost layer of the reinforcing layers is reduced. That is, the SAT due to the cords can be suppressed by the SAT generated at the block-shaped land portion.

Accordingly, a favorable steering stability on icy and snowy roads and the like can be obtained with a vehicle to which such pneumatic tires are mounted.

A third aspect of the invention is a pneumatic tire according to the second aspect, wherein the vtrtual central plane is shaped so as to be twisted around a first central axis of twisting extending in the tire radial direction in the block-shaped land portion, a position P1 of the first central axis of twisting in a region between one end surface of the block-shaped land portion and the other end surface in the tire transverse direction being within a range satisfying the following relational expression:

$$0.2\,W \leq P1 \leq 0.8\,W$$

wherein P1 represents the position of the first central axis of twisting; and W represents a distance from one end surface to the other end surface of the block-shaped land portion in the tire transverse direction.

In the third aspect of the present invention, the sipe is formed with a shape in which the virtual central plane is twisted around the first central axis of twisting extending in the tire radial direction. In this case, since the position P1 of the first central axis of twisting is within the range of $0.2\,W \leq P1 \leq 0.8\,W$ with respect to the width W of the block-shaped land portion, stiffness increases more than in the small blocks divided by the sipe whose position P1 is not within the above-mentioned range (see FIG. 24). Thus, leaning of the small blocks is further suppressed and a contact patch area area on the contact patch area increases, so that the performance on ice and snow improves even more.

A fourth aspect of the invention is a pneumatic tire according to the second and third aspects, wherein the virtual central plane is shaped so as to be twisted around a second central axis of twisting extending substantially in the tire transverse direction in the block-shaped land portion, a position P2 of the second central axis of twisting in a region between the contact patch area and the bottom of the sipe in the tire radial direction being within a range satisfying the following relational expression:

$$0.2\,F \leq P2 \leq 0.6\,F$$

wherein P2 represents the position of the second central axis of twisting; and F represents a distance from the contact patch area to the bottom of the sipe in the tire radial direction.

In the fourth aspect of the invention, the sipe is formed with a shape in which the virtual central plane is twisted around the second central axis of twisting extending substantially in the tire transverse direction. In this case, since the position P2 of the second central axis of twisting is within the range of $0.2\,F \leq P2 \leq 0.6\,F$ with respect to the sipe depth F, stiffness increases more than in the small blocks divided by the sipe whose position P2 is not within the above-mentioned range (see FIG. 25). Thus, leaning of the small blocks is further suppressed and a contact patch area area on the contact patch area increases, so that the performance on ice and snow improves even more.

A fifth aspect of the invention is a pneumatic tire comprising: a plurality of reinforcing layers in which cords, which are inclined at a predetermined angle with respect to a tire circumferential direction, are provided parallel to each other; a tread provided on a top of the reinforcing layers which are laminated; and a block-shaped land portion having a sipe, the block-shaped land portion being defined on a tread surface by main grooves formed in the tire circumferential direction and by lug grooves formed in a direction intersecting the main grooves; wherein the sipe is shaped as a closed loop which is connected with neither the main groove nor the lug groove, the sipe including a surface portion exposed on a contact patch area of the block-shaped land portion and a bottom portion formed in a bottom of the sipe, the sipe being twisted from the surface portion toward the bottom portion.

In the fifth aspect of the invention, since the sipe is structured so as to be twisted from the surface portion toward the bottom portion, when the block-shaped land portion is compressed in a height direction due to ground contact pressure and expands in a cross direction, small blocks divided by the sipe abut each other. Moreover, since the sipe which is formed in the shape of a closed loop is twisted, the small blocks divided by the sipe abut each other not only due to a force exerted in the tire circumferential direction (the tire rotation direction), but also due to forces exerted from other directions. Further, since the small blocks perform a rotational motion due to ground contact pressure, the adjacent small blocks abut each other with a strong force.

In this way, since the sipe is formed with a twist, the small blocks abut each other with a strong force, so that leaning is suppressed with certainty. As a result, a contact patch area area on the contact patch area of the small blocks increases, and a performance on ice and snow improves.

Moreover, when ground contact pressure is exerted on the contact patch area of the block-shaped land portion, the block-shaped land portion is compressed in the height direction, so that the small blocks, while guided by the sipe, deform in a direction in which the sipe is further twisted. Due to this deformation, an SAT (a torque for restoring the small blocks to their original shape) exerted in a direction opposite to the twisting direction of the small blocks is generated on the small blocks.

Thus, by forming the block-shaped land portion, in which the sipes are twisted in an appropriate direction, on the tread surface, an SAT, generated by an inclination, with respect to the tire circumferential direction, of cords which form an outermost layer of the reinforcing layers is reduced. That is, the SAT due to the cords can be suppressed by the SAT generated at the block-shaped land portion.

Accordingly, a favorable steering stability on icy and snowy roads and the like can be obtained with a vehicle to which such pneumatic tires are mounted.

A sixth aspect of the invention is a pneumatic tire according to any of the first through fifth aspects, wherein the block-shaped land portion is twisted from the contact patch area toward the bottom portion.

In the sixth aspect of the invention, since not only the sipe but also the block-shaped land portion is twisted, a force exerted on the block-shaped land portion in the rotation direction due to ground contact pressure increases.

Accordingly, in the block-shaped land portion, a force which causes the adjacent small blocks to abut each other, or an SAT of the small blocks (a torque for restoring the small blocks to their original shapes) increases further, thereby further increasing steering stability of the pneumatic tire.

A seventh aspect of the invention is a pneumatic tire according to the sixth aspect, wherein a direction of twisting of the block-shaped land portion is the same as a direction of twisting of the sipe twisted from the contact patch area toward the bottom of the sipe.

In the seventh aspect of the invention, since the twist direction of the sipe twisted from the contact patch area toward the bottom of the sipe and the twist direction of the block-shaped land portion are the same, the direction of the rotation of the small blocks caused by the sipe due to ground contact pressure and the direction of the rotation of the block-shaped land portion caused by the twist of the block-shaped land portion coincide. Accordingly, an SAT (a torque for restoring the block to the original shape) generated in the block-shaped land portion increases further, thereby further facilitating suppression of the SAT generated by the cords. As a result, steering stability improves even more.

An eighth aspect of the invention is a pneumatic tire according to the sixth aspect, wherein a direction of twisting of the block-shaped land portion is opposite to a direction of twisting of the sipe from the contact patch area toward the bottom of the sipe.

In the eighth aspect of the invention, since the twist direction of the block-shaped land portion and the twist direction of the sipe twisted from the contact patch area toward the bottom of the sipe are opposite, the direction of the rotation of the block-shaped land portion caused by the twist of the block-shaped land portion and the direction of the rotation of the small blocks caused by the twist of the sipe are opposite. Therefore, the small blocks may be brought into contact with each other with a strong force. As a result, leaning of the small blocks is suppressed still further and the performance on ice and snow improves.

BRIEF DESCRIPTION OF THE DRAWINGS

FIG. 20 is a diagram showing SAT test results.

FIG. 21 is a diagram showing displacement amount test results.

FIG. 22 is a diagram showing on-ice brake performance test results.

BEST MODE FOR IMPLEMENTING THE INVENTION

In order to describe the present invention in more detail, the invention will be described in accordance with the accompanying drawings.

First Embodiment

A pneumatic tire relating to a first embodiment of the present invention will be described in accordance with FIG. 1 through FIG. 4.

Figure 1:
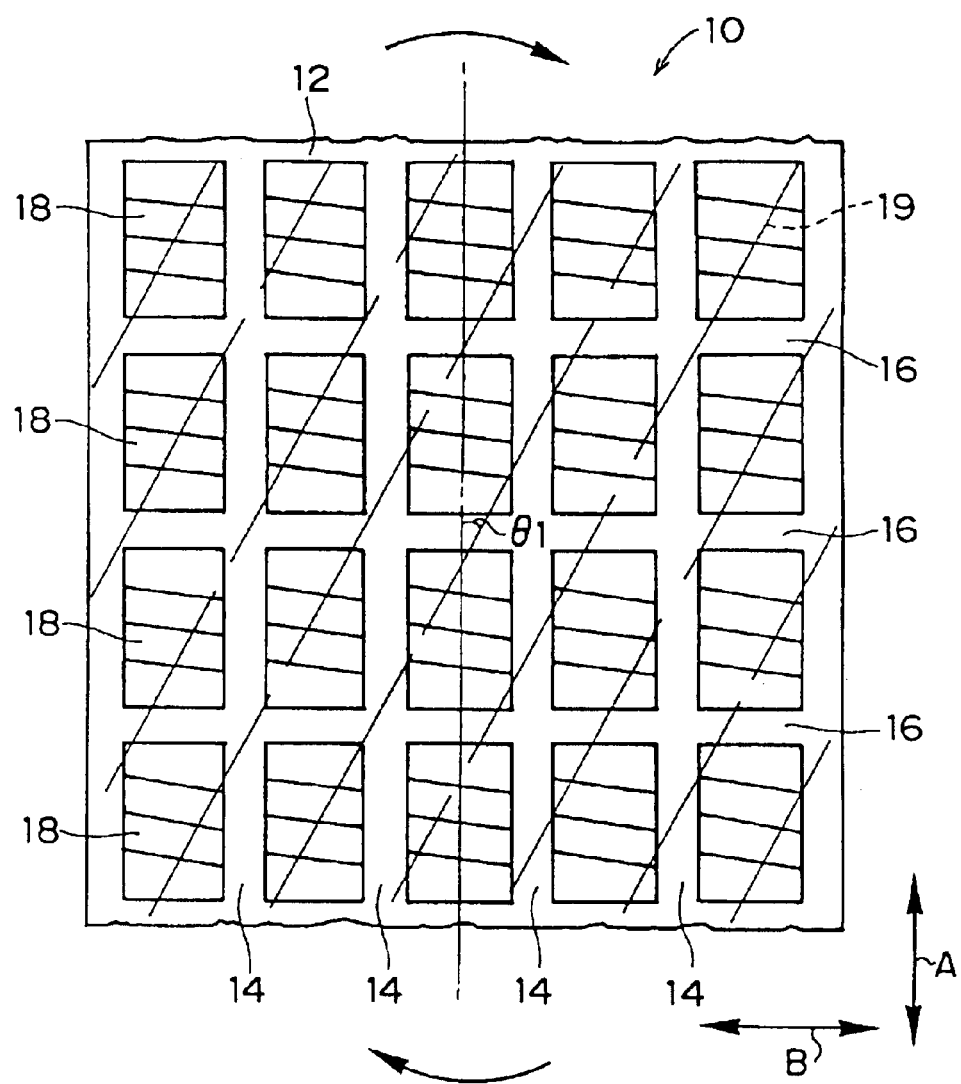
FIG. 1 is a plan view of a tread of a pneumatic tire relating to the present invention.

As illustrated in FIG. 1, in a tread 12 of a pneumatic tire 10 of the present embodiment, a plurality of blocks 18 are formed. The blocks 18 are demarcated by main grooves 14, which extend along the tire circumferential direction (the direction indicated by arrow A, and referred to as the A direction hereinafter), and by lug grooves 16, which extend along the tire transverse direction (the direction indicated by arrow B, and referred to as the B direction hereinafter).

Reinforcing layers in which steel cords 19 are inclined at a predetermined angle with respect to an A direction are laminated under the tread 12 in order to ensure stiffness of the pneumatic tire 10. In the outermost reinforcing layer closest to the tread 12 surface, the steel cords 19 are disposed parallel to each other and inclined at a predetermined angle $\theta 1$ with respect to the A direction as shown in FIG. 1.

Figure 2:
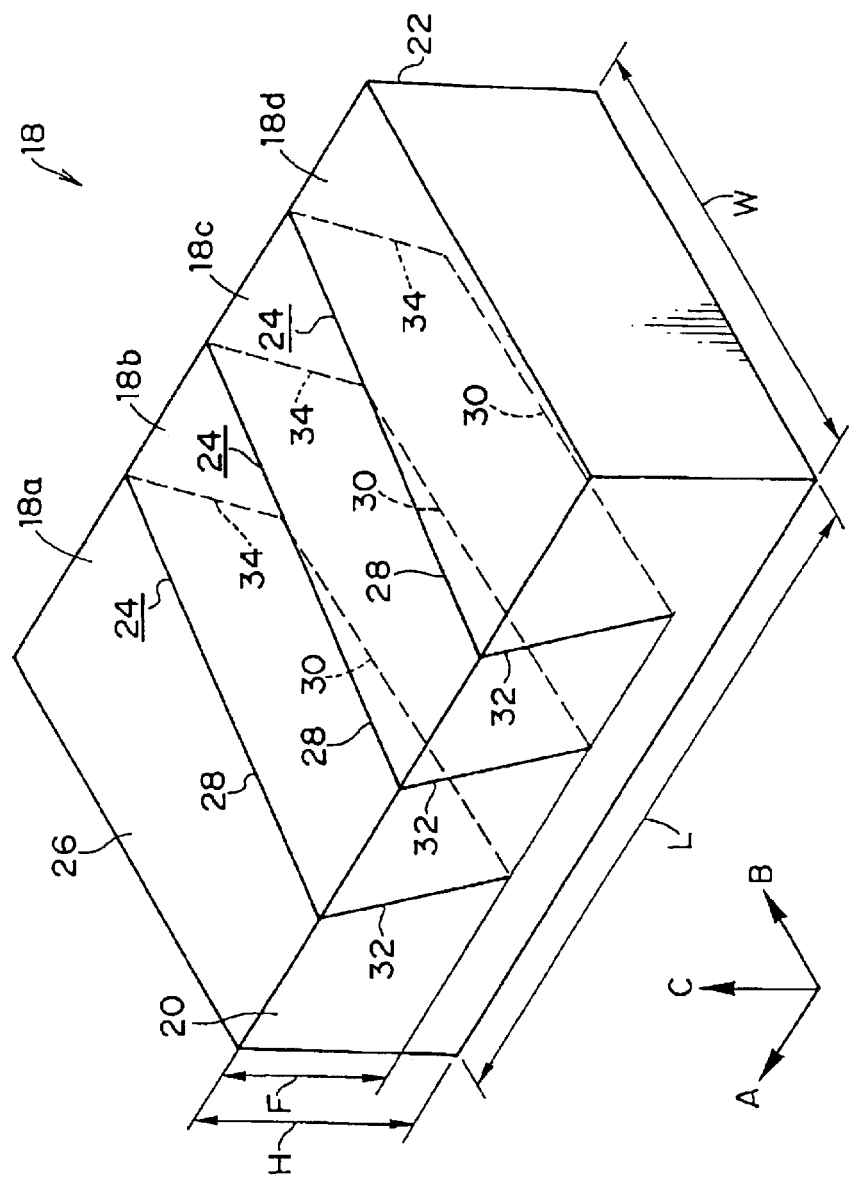
FIG. 2 is a perspective view of a block relating to a first embodiment of the present invention.

As shown in FIG. 2, sipes 24 (both-sides-open), which open to side surfaces 20, 22 in the B direction, are formed in the block 18.

Figure 3:
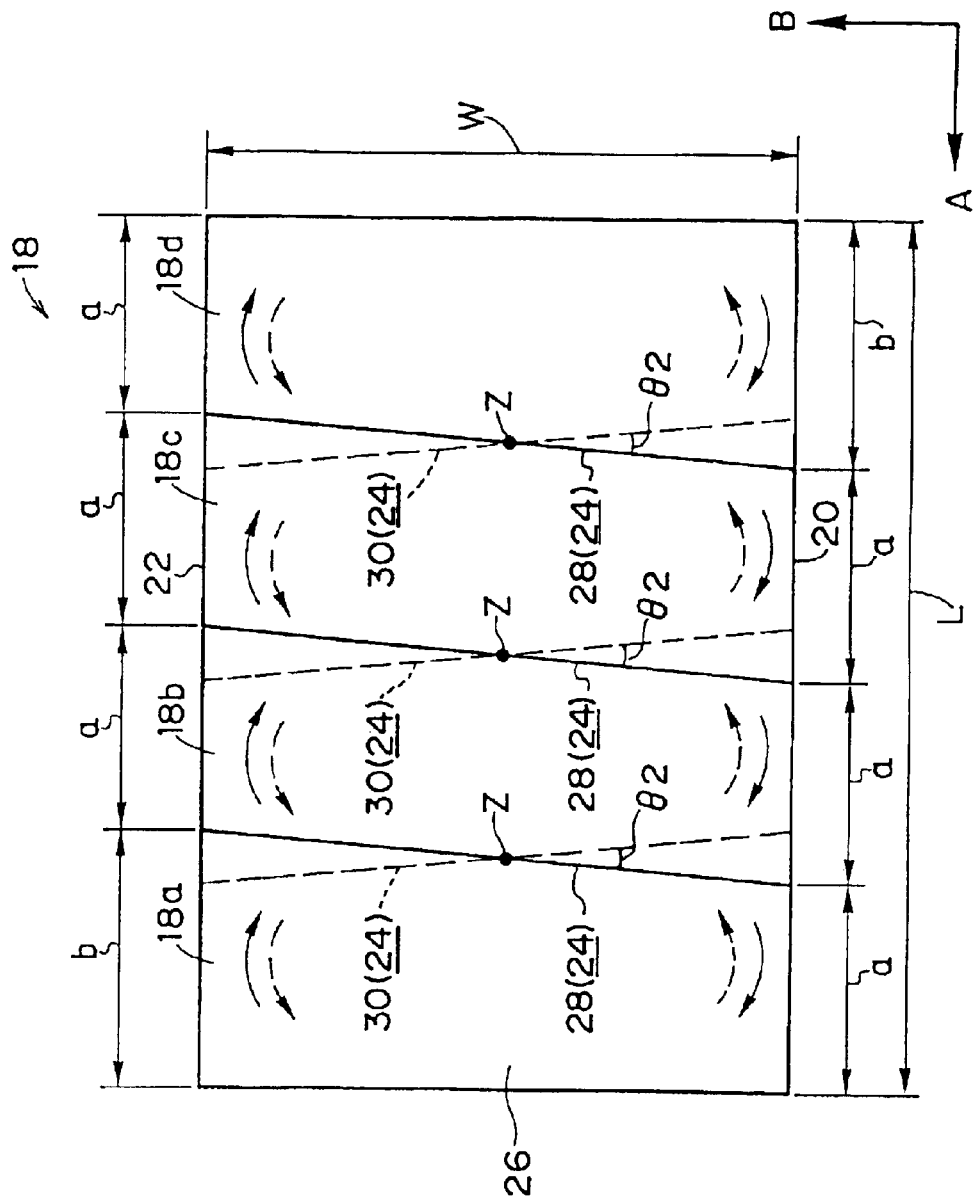
FIG. 3 is a plan view of the block relating to the first embodiment of the present invention.

The sipe 24 includes a surface portion 28, which is linear at a contact patch area 26, and a bottom portion 30, which is linear at a bottom of the sipe. A plan view seen from the contact patch area 26 shows that the surface portion 28 and the bottom portion 30 cross in an X shape as illustrated in FIG. 3.

Figure 4:
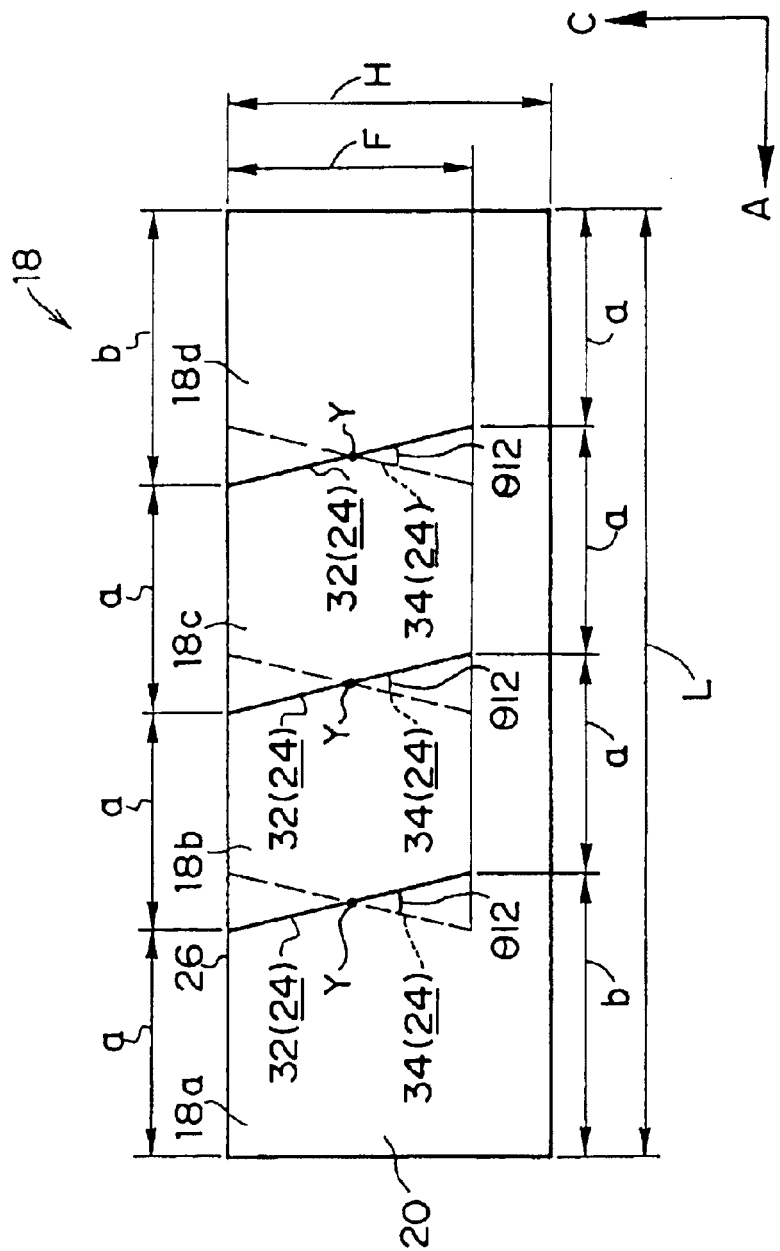
FIG. 4 is a side view of the block relating to the first embodiment of the present invention.

Moreover, the sipe 24 includes a first side surface portion 32, which is linear at the side surface 20, and a second side surface portion 34, which is linear at the side surface 22. A side view seen from the side surface 20 shows that the first side surface portion 32 and the second side surface portion 34 cross in an X shape as illustrated in FIG. 4.

That is, the sipe 24 is shaped so as to pass through a cross-point where the surface portion 28 and the bottom portion 30 intersect in the plan view seen from the contact patch area 26, and is twisted at an angle $\theta 2$ from the surface portion 28 toward the bottom portion 30 around a rotation axis Z perpendicular to the contact patch area 26.

Further, the sipe 24 is shaped so as to pass through a cross-point where the first side surface portion 32 and the second side surface portion 34 intersect in the side view seen from the side surface 20, and is twisted at an angle $\theta 12$ from the first side surface portion 32 toward the second side surface portion 34 around a rotation axis Y substantially parallel to the contact patch area 26.

The block 18 is divided into small blocks 18a to 18d at the contact patch area 26 side by means of the sipes 24 formed in such a manner.

By driving a vehicle to which the pneumatic tires 10 formed in the above-described manner are mounted, effects such as the following are obtained.

A force perpendicular to the contact patch area 26 is exerted from the road surface on the contact patch area 26 of the block 18. Due to this, the block 18 is compressed in a height direction (the direction indicated by arrow C, and referred to as the C direction hereinafter) and expands in a cross direction (the A, B directions), and as a result, the small blocks opposing one another across the sipe 24 abut each other. At this time, since the sipe 24 is formed with a twisted shape, the adjacent small blocks abut each other not only due to a force exerted in the A direction (the tire rotation direction) caused by frictional force, but also due to a force exerted in the B direction upon cornering, and the like.

Moreover, since the small blocks 18a to 18d rotate clockwise (see the solid line arrows in FIG. 3) in the plan view seen from the contact patch area 26 due to ground contact pressure, the adjacent small blocks abut each other.

That is, since the sipe 24 is formed with a twisted shape, the adjacent small blocks strongly abut each other due to forces exerted from various directions.

Accordingly, leaning of the small blocks 18a to 18d is greatly suppressed, and a contact patch area area on the contact patch area 26 of the block 18 increases, so that a favorable performance on ice and snow is ensured.

Further, due to the above-described rotation of the small blocks 18a to 18d, a counterclockwise torque for restoring the small block to the original shape (SAT) is generated at each of the small blocks 18a to 18d (see broken line arrows in FIG. 3).

Therefore, a clockwise SAT (see arrows in FIG. 1) generated due to the steel cords 19 provided parallel to each other in the outermost reinforcing layer can be suppressed (reduced) by a counterclockwise SAT generated by each block 18.

It is preferable that a position P1 of the rotation axis Z in the plan view seen from the contact patch area 26 is within a range of $0.2 \, W \leq P1 \leq 0.8 \, W$ (where W is the width of the block 18 in the B direction and the same definition holds hereinafter) from the side surface 20 toward the side surface 22 in the B direction. By locating the rotation axis Z within this range, stiffness of the small blocks 18a to 18d increases and leaning of the small blocks 18a to 18d can be prevented. Consequently, the performance on ice and snow improves even more.

It is also preferable that a position P2 of the rotation axis Y in the side view seen from the side surface 20 is within a range of $0.2 \, F \leq P1 \leq 0.6 \, F$ (where F is the vertical (C direction) depth of the sipe 24 and the same definition holds hereinafter) from the contact patch area 26 toward the bottom portion 30 (the bottom of the sipe) in the C direction. By locating the rotation axis Y within this range, stiffness of the small blocks 18a to 18d increases and leaning of the small blocks 18a to 18d can be prevented. Consequently, the performance on ice and snow improves even more.

The size of the block 18 according to the present embodiment is a L (Length)×W (Width)×H (Height) of 30 mm×20 mm×10 mm. The vertical depth F of the sipe 24 from the contact patch area 26 is 8 mm. Moreover, the sipes 24 are formed in positions where at the side surface 20, 'a', which is the distance from an end surface of the block 18 in the A direction and also is the distance between the adjacent sipes, is 7 mm, and 'b', which is the distance to the other end surface, is 9 mm, while at the opposite side surface 22, 'b', the distance from the end surface of the block 18 in the A direction, is 9 mm, and 'a', the distance between the adjacent sipes and the distance to the other end surface, is 7 mm. The sipe 24 is shaped such that straight lines connect the both side end surfaces. The twist angle θ2 of the sipe 24 is 11.4° and the twist angle θ12 is 28.1°.

Second Embodiment

Next, a pneumatic tire relating to a second embodiment of the present invention will be described in accordance with FIGS. 5 and 6. Since the only difference between the pneumatic tire of the first embodiment and that of the present embodiment is the shape of sipes, only a sipe and a blade which is used to form the sipe will be described. The same reference numerals are used to designate elements which are the same as those in the first embodiment, and detailed description thereof will be omitted.

First, the shape of a blade which forms a sipe will be described in accordance with FIG. 6. A blade 40 is formed with such a shape that protruding portions 42, which are triangular with a height of 0.5 K in a D directional section, are formed in a zigzag, i.e., protruding alternately on the both sides of a virtual central plane V with intervals J. Each protruding portion 42 extends in the E direction which is perpendicular to the D direction. The blade 40 formed in such a manner is placed such that the virtual central plane V is located at the same position where the sipe 24 of the first embodiment is located, and the blocks are vulcanization molded in a mold.

Figure 5:
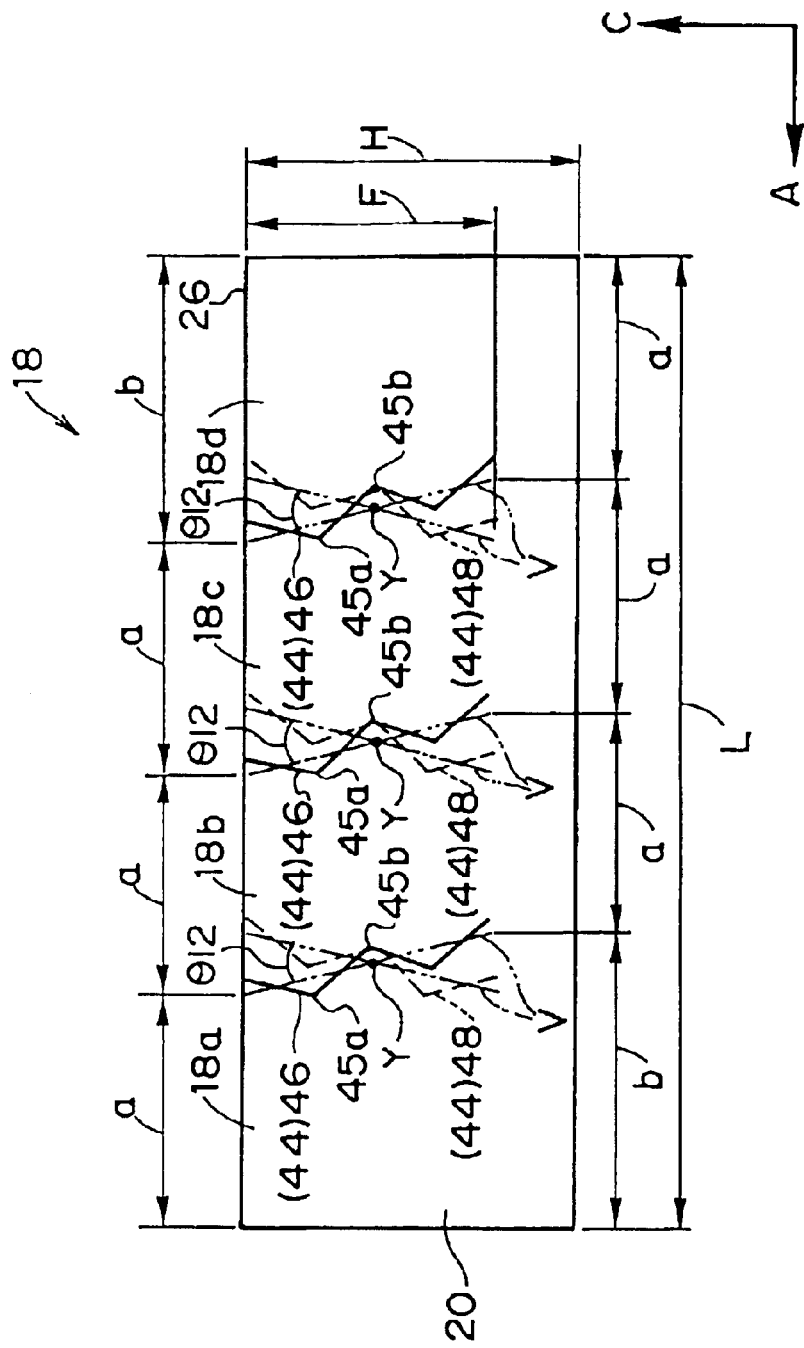
FIG. 5 is a side view of a block relating to a second embodiment of the present invention.
Figure 6:
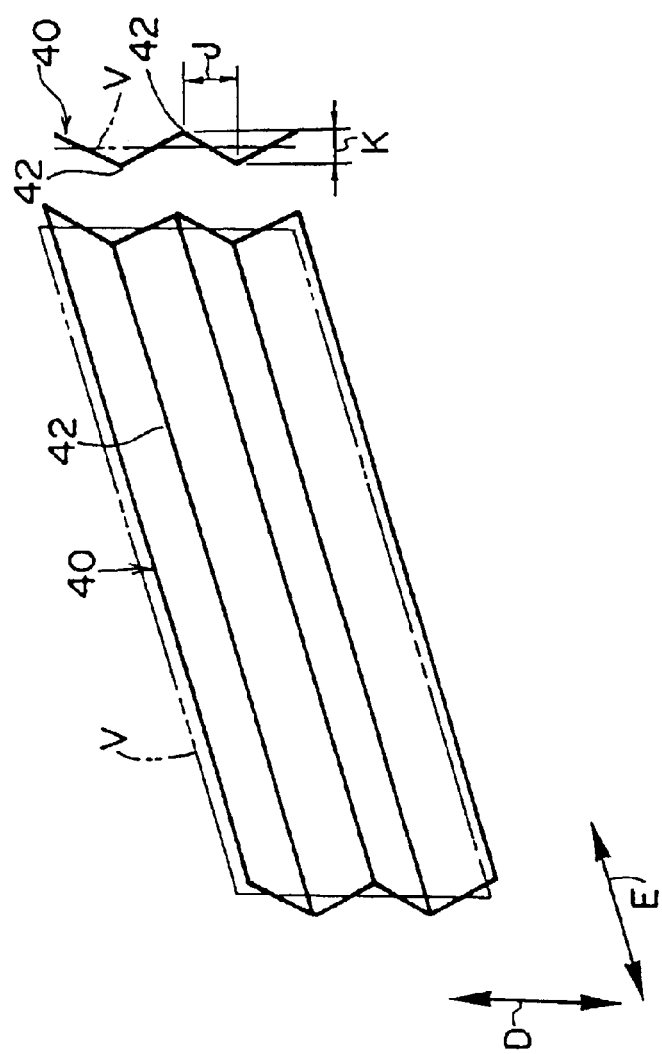
FIG. 6 is a diagram explaining the shape of a blade relating to the second embodiment of the present invention.

A sipe 44 of the block 18 molded by the blade 40 is formed such that when side-viewed from the side surface 20 as shown in FIG. 5, a virtual central plane V of the sipe 44 is located at the same position in the block 18 where the sipe 24 of the first embodiment is located.

That is, when side-viewed from the side surface 20, (a virtual central plane V of) a first side surface portion 46 in the side surface 20 and (a virtual central plane V of) a second side surface portion 48 in the side surface 22 cross in an X shape as illustrated in FIG. 5. Moreover, the sipe 44 is formed such that in a plan view seen from the contact patch area 26, the virtual central plane V of the sipe 44 is located at the position where the sipe 24 in FIG. 3 is located.

Therefore, substantially in the same manner as the sipe 24 of the first embodiment, the virtual central plane V of the sipe 44 has a shape which is twisted at an angle θ2, in the plan view seen from the contact patch area 26 (see FIG. 3), from the contact patch area 26 toward the bottom of the sipe around the rotation axis Z perpendicular to the contact patch area 26.

Further, the virtual central plane V of the sipe 44 is shaped so as to pass through a cross-point where the virtual central plane V at the side surface 20 and the virtual central plane V at the side surface 22 intersect in the side view seen from the side surface 20 and which is twisted at an angle θ12 from the side surface 20 toward the side surface 22 around the rotation axis Y substantially parallel to the contact patch area 26 (see FIG. 5).

As shown in FIG. 5, the sipe 44 has first protruding portions 45a which protrude in a first direction with respect to the virtual central plane V and second protruding portions 45b which protrude in a second direction opposite to the first direction corresponding to the protruding portions 42 of the blade 40.

By driving a vehicle to which the pneumatic tires 10 formed in the above-described manner are mounted, effects such as the following are obtained.

That is, in the same manner as the first embodiment, since the sipe 44 is formed with a twist of an angle θ2, the adjacent small blocks abut each other with a strong force due to forces from various directions exerted from the contact patch area 26 of the block 18.

Further, since the small blocks 18a to 18d rotate clockwise (see solid line arrows in FIG. 3) in the plan view seen from the contact patch area 26 due to ground contact pressure, the adjacent small blocks abut each other.

In particular, since the sipe 44 has recessed and protruding portions whose AC-section (a section cut by a plane defined by the A direction and the C direction and the same definition holds hereinafter) is triangular, the surfaces of the recessed and protruding portions of the adjacent small blocks abut each other across the sipe 44 by compression of the small blocks 18a to 18d in the C direction.

As a result, leaning of the small blocks 18a to 18d is suppressed further, and the performance on ice and snow can be improved even more.

Moreover, in the same manner as the first embodiment, since the sipe 44 has a shape which is twisted at an angle θ2 around the rotation axis Z, the small blocks 18a to 18d rotate clockwise in the plan view seen from the contact patch area 26 due to ground contact pressure.

Due to this rotation, a counterclockwise torque for restoring the small block to the original shape (SAT) is generated in each of the small blocks 18a to 18d.

Therefore, a clockwise SAT (see arrows in FIG. 1) generated due to the steel cords 19 provided parallel to each other in the outermost reinforcing layer can be suppressed (reduced) by a counterclockwise SAT generated by each block 18.

It is preferable that, in the same manner as the first embodiment, a position P1 of the rotation axis Z in the plan view seen from the contact patch area 26 is within a range of 0.2 W≦P1≦0.8 W from the side surface 20 toward the side surface 22 in the B direction. It is also preferable that a position P2 of the rotation axis Y in the side view seen from the side surface 20 is within a range of 0.2 F≦P2≦0.6 F from the contact patch area 26 toward the bottom portion 30 in the C direction. By locating the rotation axis Z and the rotation axis Y within these ranges, stiffness of the small blocks 18a to 18d increases and leaning of the small blocks 18a to 18d can be prevented. Consequently, the performance on ice and snow improves even more.

In the same manner as the first embodiment, the size of the block 18 according to the present embodiment is a L (Length)×W (Width)×H (Height) of 30 mm×20 mm×10 mm. The vertical depth F of the sipe 44 from the contact patch area 26 is 8 mm. Moreover, the sipes 44 are formed such that the virtual central planes V are located in positions where at the side surface 20, 'a', which is the distance from an end surface of the block 18 in the A direction and also is the distance between the adjacent sipes, is 7 mm, and 'b', which is the distance to the other end surface, is 9 mm, while at the opposite side surface 22, 'b', the distance from the end surface of the block 18 in the A direction, is 9 mm, and 'a', the distance between the adjacent sipes and the distance to the other end surface, is 7 mm. The sipe 44 is shaped such that straight lines connect the both side end surfaces. The twist angle θ2 of the sipe 44 is 11.4° and the twist angle θ12 is 28.1°.

The sipe 44 has a shape in which the D direction of the virtual central plane V of the blade 40 corresponds with the sipe depth direction and the E direction corresponds with the sipe transverse direction. Accordingly, the interval and height of the triangular section of the sipe 44 are the same as those of the blade. The distance J between vertices of the adjacent triangles is 2 mm, and the height difference K between the vertices is 1 mm (the height from the virtual central plane V (0.5 K) is 0.5 mm).

Third Embodiment

Next, a pneumatic tire relating to a third embodiment of the present invention will be described in accordance with FIG. 7 and FIG. 8. Since the only difference between the pneumatic tires of the first and second embodiments and that of the present embodiment is the shape of sipes, only a sipe and a blade which is used to form the sipe will be described. The same reference numerals are used to designate elements which are the same as those in the first and second embodiments, and detailed description thereof will be omitted.

First, the shape of a blade which forms a sipe will be described in accordance with FIG. 8. A blade 50 is formed with such a shape that protruding portions 52, which are triangular with a height of 0.5 L in an E directional section, are formed in a zigzag, i.e., protruding alternately on the both sides of a virtual central plane V with intervals M. Each protruding portion 52 extends in the D direction which is perpendicular to the E direction. The blade 50 with such a structure is placed such that the virtual central plane V is located at the same position where the sipe 24 of the first embodiment is located, and the blocks are vulcanization molded in a mold.

Figure 7:
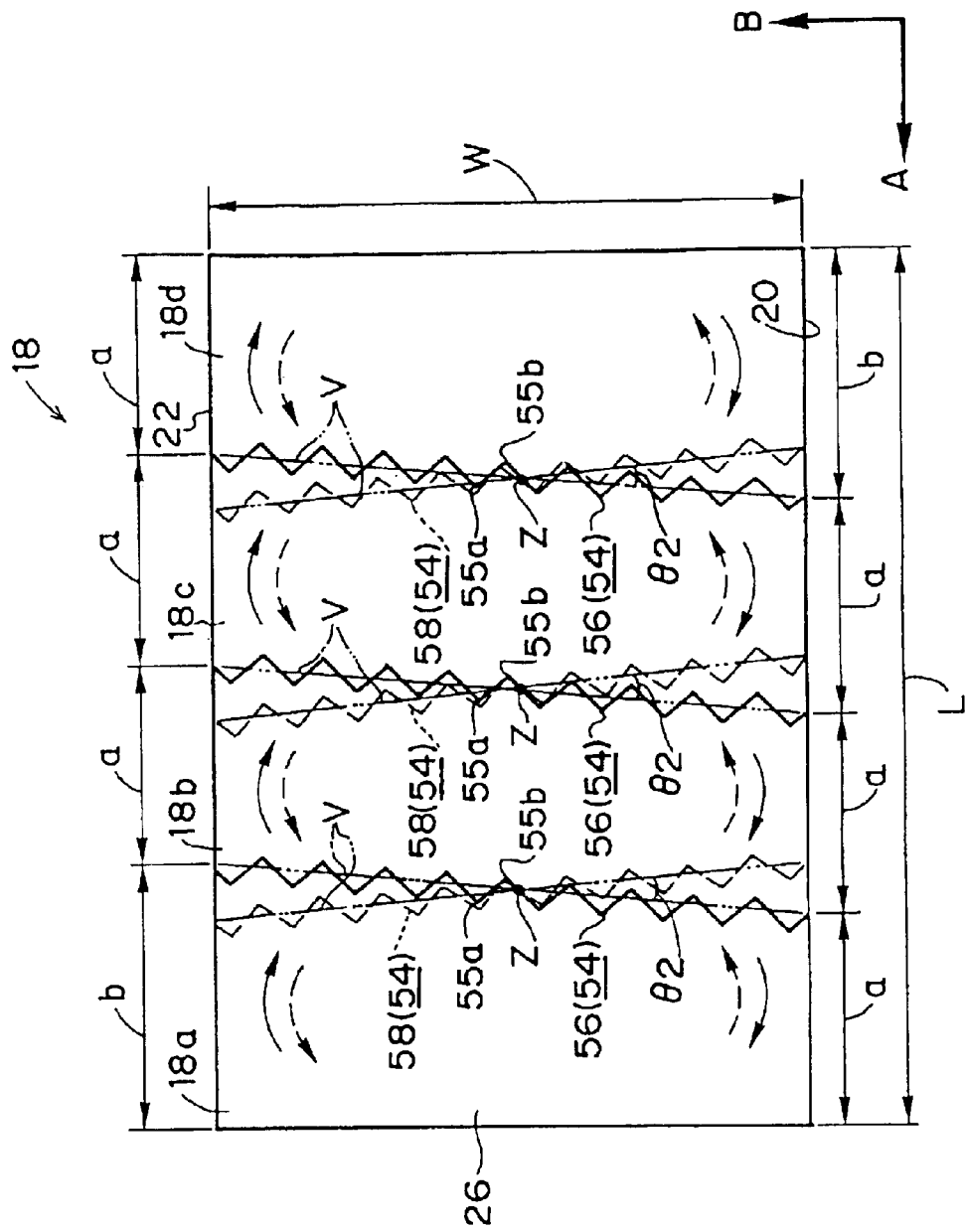
FIG. 7 is a plan view of a block relating to a third embodiment of the present invention.
Figure 8:
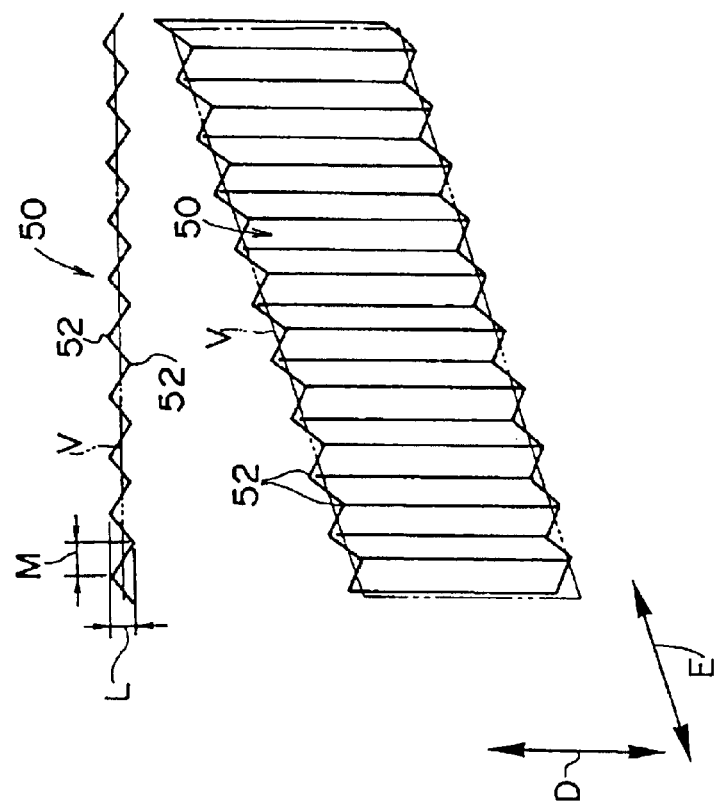
FIG. 8 is a diagram explaining the shape of a blade relating to the third embodiment of the present invention.

A sipe 54 of the block 18 molded by the blade 50 is provided such that in a plan view seen from the contact patch area 26 as shown in FIG. 7, the virtual central plane V is located at the same position where the sipe 24 of the first embodiment is located. That is, in the plan view seen from the contact patch area 26, (a virtual central plane V of a surface portion 56 of the sipe 54 at the contact patch area 26 and (a virtual central plane V on a bottom portion 58 at the bottom of the sipe cross in an X shape as illustrated in FIG. 7.

Further, the sipe 54 is formed such that when side-viewed from the side surface 20, a virtual central plane V of the sipe 54 is located at the position where the sipe 24 in FIG. 4 is located, and the virtual central plane V at the side surface 20 and the virtual central plane V at the side surface 22 cross in an X shape.

Therefore, substantially in the same manner as the sipe 24 of the first embodiment, the sipe 54 is shaped so as to pass through a cross-point where the virtual central plane V of the surface portion 56 and the virtual central plane V of the bottom portion 58 intersect and is twisted at an angle θ2 from the contact patch area 26 toward the bottom of the sipe around the rotation axis Z perpendicular to the contact patch area 26.

Moreover, the sipe 54 is shaped, in the side view, so as to pass through a cross-point where the virtual central plane V at the side surface 20 and the virtual central plane V at the side surface 22 intersect and is twisted at an angle θ12 from the side surface 20 toward the side surface 22 around the rotation axis Y substantially parallel to the contact patch area 26.

As shown in FIG. 7, the sipe 54 has first protruding portions 55a which protrude in a first direction with respect to the virtual central plane V and second protruding portions 55b which protrude in a second direction opposite to the first direction corresponding to the protruding portions 52 of the blade 50.

By driving a vehicle to which the pneumatic tires 10 formed in the above-described manner are mounted, effects such as the following are obtained.

That is, in the same manner as the first embodiment, since the sipe 54 is formed with a twist of an angle θ2 in the plan view seen from the contact patch area 26, the small blocks 18a to 18d strongly abut each other not only due to a force exerted from the A direction due to a frictional force, but also due to forces from various directions exerted from the contact patch area 26 of the block 18. In particular, since the sipe 54 is provided with recessed and protruding portions having a triangular section in a plane parallel to the contact patch area 26, the adjacent small blocks are brought to fit together with a strong force at their recessed and protruding portions as the small blocks 18a to 18d deform (rotate) in the direction indicated by solid lines due to compression in the C direction.

Thus, leaning of the small blocks 18a to 18d is suppressed further, and the performance on ice and snow can be improved even more.

Moreover, in the same manner as the first embodiment, since the sipe 54 has a shape twisted at an angle θ2 around the rotation axis Z, the small blocks 18a to 18d rotate clockwise in the plan view seen from the contact patch area 26 (see the solid line arrows in FIG. 7) due to ground contact pressure.

Due to this rotation, a counterclockwise torque for restoring the small block to the original shape (SAT) is generated in each of the small blocks 18a to 18d (see broken line arrows in FIG. 7).

Therefore, a clockwise SAT (see arrows in FIG. 1) generated due to the steel cords 19 provided parallel to each other in the outermost reinforcing layer can be suppressed (reduced) by a counterclockwise SAT generated by each block 18.

It is preferable that a position P1 of the rotation axis Z in the plan view seen from the contact patch area 26 is within a range of $0.2\ W \leq P1 \leq 0.8\ W$ from the side surface 20 toward the side surface 22 in the B direction in the same manner as the first embodiment. It is also preferable that a position P2 of the rotation axis Y in the side view seen from the side surface 20 is within a range of $0.2\ F \leq P2 \leq 0.6\ F$ from the contact patch area 26 toward the bottom portion (the bottom of the sipe) in the C direction. By locating the rotation axis Z and the rotation axis Y within these ranges, stiffness of the small blocks 18a to 18d increases and leaning of the small blocks 18a to 18d can be prevented. Consequently, the performance on ice and snow improves even more.

In the same manner as the first embodiment, the size of the block 18 according to the present embodiment is a L (Length)×W (Width)×H (Height) of 30 mm×20 mm×10 mm. The vertical depth F of the sipe 54 from the contact patch area 26 is 8 mm. Moreover, the sipes 54 are formed such that the virtual central planes V are located in positions where at the side surface 20, 'a', which is the distance from an end surface of the block 18 in the A direction and also is the distance between the adjacent sipes, is 7 mm, and 'b', which is the distance to the other end surface, is 9 mm, while at the opposite side surface 22, 'b', the distance from the end surface of the block 18 in the A direction, is 9 mm, and 'a', the distance between the adjacent sipes and the distance to the other end surface, is 7 mm. The sipe 54 is shaped such that straight lines connect the both side end surfaces. The twist angle θ2 of the sipe 54 is 11.4° and the twist angle θ12 is 28.1°.

The sipe 54 is shaped such that the D direction of the virtual central plane V of the blade 50 corresponds with the sipe depth direction and the E direction corresponds with the sipe transverse direction. Accordingly, the interval and height of the triangular section of the sipe 54 are the same as those of the blade 50. The distance M between vertices of the adjacent triangles is 1 mm, and the height difference L between the vertices is 1 mm (the height from the virtual central plane V (0.5 L) is 0.5 mm).

Fourth Embodiment

Next, a pneumatic tire relating to a fourth embodiment of the present invention will be described in accordance with FIG. 9. Since the only difference between the pneumatic tires of the first to third embodiments and that of the present embodiment is the shape of the sipes, description of a blade which is used to form a sipe will be presented instead of describing the shape of the sipe. The same reference numerals are used to designate elements which are the same as those in the first to third embodiments, and detailed description thereof will be omitted.

Figure 9:
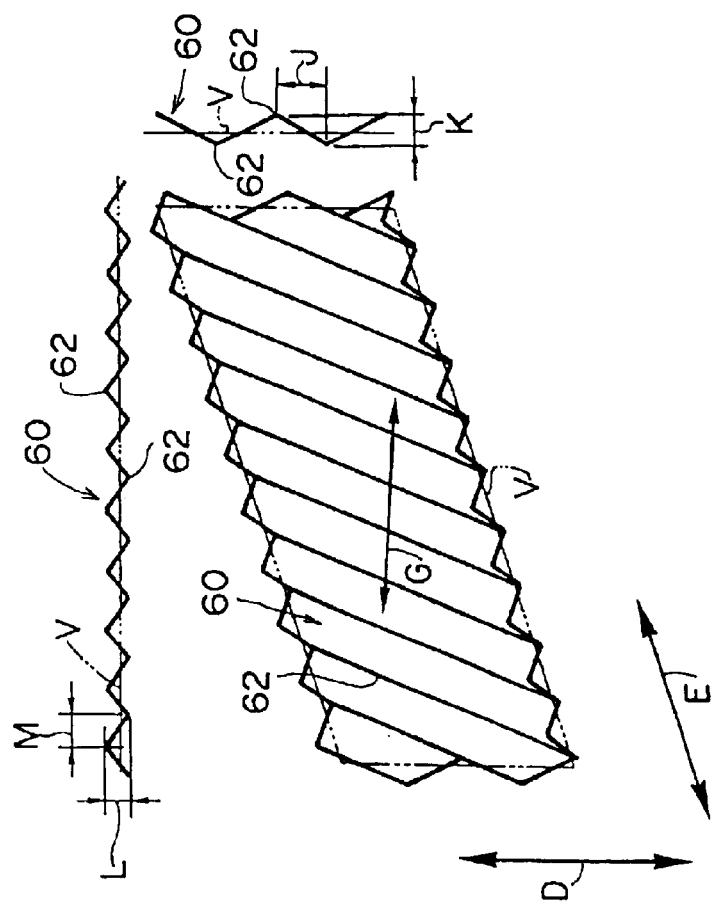
FIG. 9 is a diagram explaining the shape of a blade relating to a fourth embodiment of the present invention.

As shown in FIG. 9, a blade 60 is formed in a shape such that protruding portions 62, which are triangular in cross-section and protrude alternately on the both sides of a virtual central plane V, are provided continuously in the directions indicated by arrow G which are inclined at predetermined angles with respect to both the D direction and the E direction.

The blade 60 is formed in a shape such that the protruding portions 62, which are triangular with a height of 0.5 K in a D directional section, are formed in a zigzag, i.e., protruding alternately at the both sides of the virtual central plane V with intervals J in the same manner as those in the second embodiment. Also, the blade 60 is formed in a shape such that the protruding portions 62, which are triangular with a height of 0.5 L in an E directional section, are formed in a zigzag, i.e., protruding alternately at the both sides of the virtual central plane V with intervals M in the same manner as those in the third embodiment.

The blade 60 formed with such a structure is placed such that the virtual central plane V is located at the same position where the sipe 24 of the first embodiment is located, and the blocks are vulcanization molded in a mold.

A sipe (not shown) of the block 18 molded by the blade 60 is provided such that the virtual central plane V is located at the same position where the sipe 24 of the first embodiment is located. That is, the sipe is shaped such that the virtual central plane V thereof is twisted at an angle θ2 from the contact patch area 26 toward the bottom of the sipe around the rotation axis Z perpendicular to the contact patch area 26 (see FIG. 7). Moreover, the sipe has such a shape that the virtual central plane V thereof is twisted at an angle θ12 from the side surface 20 toward the side surface 22 around the rotation axis Y substantially parallel to the contact patch area 26 (see FIG. 5).

By driving a vehicle to which the pneumatic tires 10 formed in the above-described manner are mounted, effects such as the following are obtained.

That is, in the same manner as the first embodiment, since the sipe is formed with a twist of an angle θ2 when viewed from the contact patch area 26, the small blocks 18a to 18d strongly abut each other not only due to a force exerted from the A direction, but also due to forces from various directions exerted from the contact patch area 26 of the block 18.

In particular, since the sipe is provided with recessed and protruding portions having triangular sections both in the sipe depth direction and at a plane parallel to the contact patch area 26, the recessed and protruding surfaces of the adjacent small blocks 18a to 18d strongly abut each other across the sipe by C directional compression of the small blocks 18a to 18d, and at the same time, the recessed and protruding portions of the adjacent small blocks 18a to 18d are brought to fit together strongly by rotational motion of the small blocks 18a to 18d as a result of compression.

Thus, leaning of the small blocks 18a to 18d is suppressed further, and the performance on ice and snow can be improved even more.

Moreover, in the same manner as the first embodiment, since the sipe has a shape twisted at an angle θ2 around the rotation axis Z, the small blocks 18a to 18d rotate clockwise in a plan view seen from the contact patch area 26 when receiving ground contact pressure.

Due to this rotation, a counterclockwise torque for restoring the small block to the original shape (SAT) is generated in each of the small blocks 18a to 18d.

Therefore, a clockwise SAT (see arrows in FIG. 1) generated due to the steel cords 19 provided parallel to each other in the outermost reinforcing layer can be suppressed (reduced) by a counterclockwise SAT generated by each block 18.

It is preferable that, in the same manner as the first embodiment, a position P1 of the rotation axis Z in the plan view seen from the contact patch area 26 is within a range of $0.2\,W \leq P1 \leq 0.8\,W$ from the side surface 20 toward the side surface 22 in the B direction. It is also preferable that a position P2 of the rotation axis Y in the side view seen from the side surface 20 is within a range of $0.2\,F \leq P2 \leq 0.6\,F$ from the contact patch area 26 toward the bottom portion 30 (the bottom of the sipe) in the C direction. By locating the rotation axis Z and the rotation axis Y within these ranges, stiffness of the small blocks 18a to 18d increases and leaning of the small blocks 18a to 18d can be prevented. Consequently, the performance on ice and snow improves even more.

In the same manner as the first embodiment, the size of the block 18 according to the present embodiment is a L (Length)×W (Width)×H (Height) of 30 mm×20 mm×10 mm. The vertical depth F of the sipe from the contact patch area 26 is 8 mm. Moreover, the sipes are formed such that the virtual central planes V are located in positions where at the side surface 20, 'a', which is the distance from an end surface of the block 18 in the A direction and also is the distance between the adjacent sipes, is 7 mm, and 'b', which is the distance to the other end surface, is 9 mm, while at the opposite side surface 22, 'b', the distance from the end surface of the block 18 in the A direction, is 9 mm, and 'a', the distance between the adjacent sipes and the distance to the other end surface, is 7 mm. The sipe is shaped such that straight lines connect the both end surfaces. The twist angle $\theta 2$ of the sipe is 11.4° and the twist angle $\theta 12$ is 28.1°.

The sipe has a shape in which the D direction of the virtual central plane V of the blade 60 corresponds with the sipe depth direction and the E direction corresponds with the sipe transverse direction. Accordingly, intervals and heights of the triangular sections of the sipe are the same as those of the blade 60. The distance J between vertices of the triangles adjacent in the sipe transverse direction is 2 mm, and the height difference K between the vertices is 1 mm (the height from the virtual central plane V (0.5K) is 0.5 mm). The distance M between vertices of the triangles adjacent in the sipe depth direction is 1 mm, and the height difference L between the vertices is 1 mm (the height from the virtual central plane V (0.5L) is 0.5 mm).

Fifth Embodiment

Further, a pneumatic tire relating to a fifth embodiment of the present invention will be described in accordance with FIG. 10. Since the only differences between the pneumatic tire of the first embodiment and that of the present embodiment are the block shape and the sipe shape, only blocks and sipes will be described. The same reference numerals are used to designate elements which are the same as those in the first embodiment, and detailed description thereof will be omitted.

A block 70 is shaped so as to be rotated at an angle $\theta 3$ from a bottom surface 72, which is located at the same height as the main groove 14 in the tread surface, toward a contact patch area 74 around a rotation axis U in a plan view seen from the contact patch area 74. That is, the block 70 has a shape which is twisted counterclockwise at an angle $\theta 3$ from the contact patch area 74 toward the bottom surface 72 around the rotation axis U perpendicular to the contact patch area 74.

A sipe 76 provided in the block 70 is also formed such that a surface portion 78, which is linear at the contact patch area 74, and a bottom portion 80, which is linear at the bottom of the sipe, cross in an X-letter shape in a plan view seen from the contact patch area 74. That is, the sipe 76 also is shaped so as to be twisted counterclockwise, in the same direction as the rotation of the block 18, at an angle $\theta 4$ from the contact patch area 74 toward the bottom of the sipe around the rotation axis Z perpendicular to the contact patch area 74.

Moreover, the sipe 76 is formed such that a first side surface portion 75 which is linear at a side surface 71 and a second side surface portion 77 which is linear at a side surface 73 cross in an X shape in a side view seen from the side surface 71. That is, the sipe 76 also is shaped so as to be twisted at an angle $\theta 13$ (not shown) from the first side surface portion 75 toward the second side surface portion 77 around the rotation axis Y (not shown) parallel to the contact patch area 74.

By driving a vehicle to which the pneumatic tires 10 formed in the above-described manner are mounted, effects such as the following are obtained.

That is, in the same manner as the first embodiment, since the sipe 76 is formed with a twist of an angle $\theta 4$, small blocks 70a to 70d strongly abut each other not only by a force exerted from the A direction, but also by forces from various directions exerted from the contact patch area 74 of the block 70.

Furthermore, since the sipe 76 and the block 70 are twisted in the same direction, the small blocks 70a to 70d carry out clockwise rotational movement (see solid line arrows in FIG. 10) in a plan view seen from the contact patch area 74, and the adjacent small blocks abut each other with even stronger forces.

Thus, leaning of the small blocks 70a to 70d is suppressed further, and the performance on ice and snow can be improved even more.

Moreover, in the same manner as the first embodiment, since the sipe 76 is shaped so as to be twisted at an angle $\theta 4$ around the rotation axis Z, the small blocks 70a to 70d rotate clockwise (see the solid line arrows in FIG. 10) in the plan view seen from the contact patch area 74 due to ground contact pressure.

Figure 10:
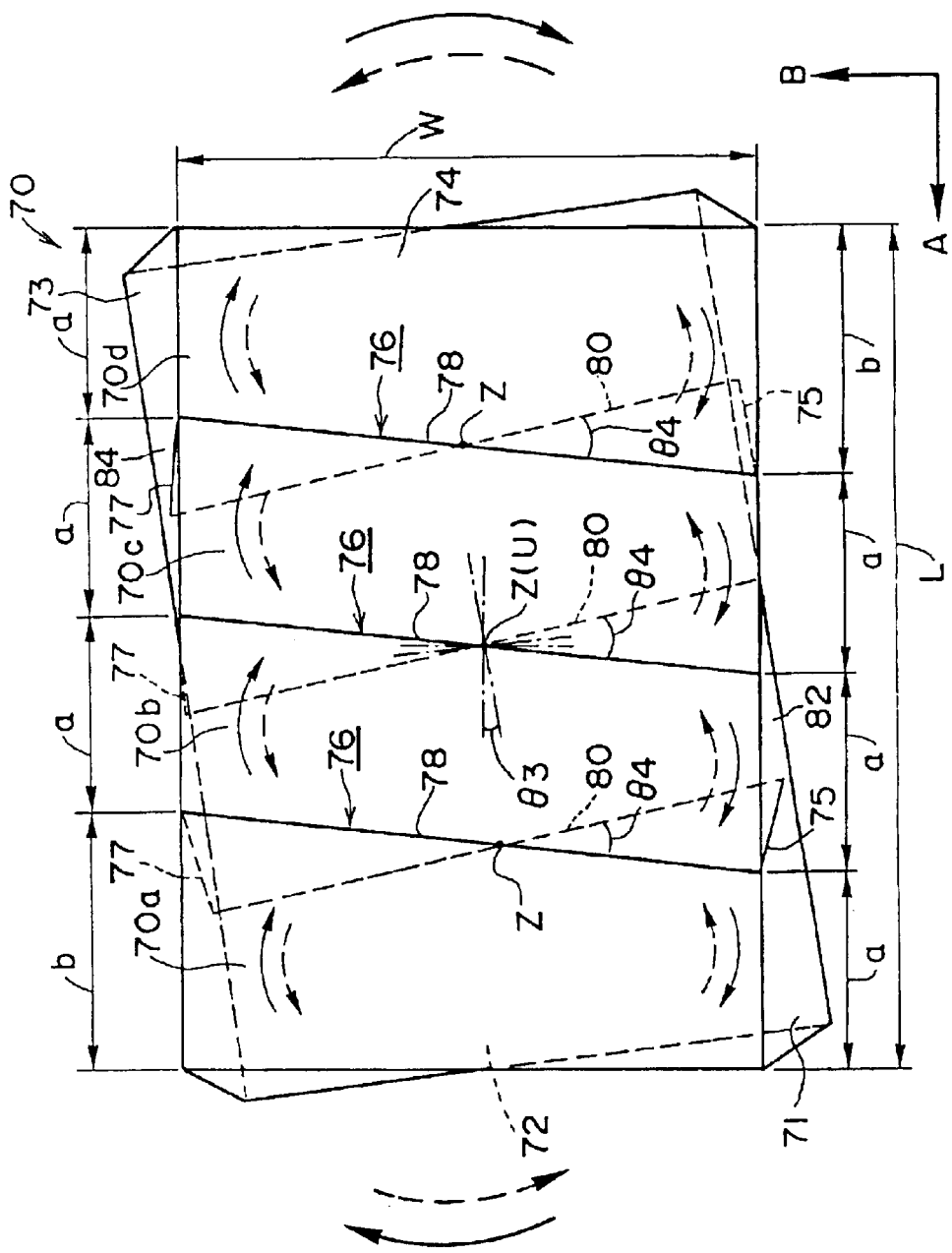
FIG. 10 is a plan view of a block relating to a fifth embodiment of the present invention.

Due to this rotation, a counterclockwise torque for restoring the small block to the original shape (SAT) is generated in each of the small blocks 70a to 70d (see the broken line arrows in FIG. 10).

At the same time, since the block 70 also has a shape which is twisted at an angle $\theta 3$ around the rotation axis U, the block 70 rotates clockwise (see the thick solid line arrows in FIG. 10) in the plan view seen from the contact patch area 74 due to ground contact pressure.

Due to this rotation, a counterclockwise torque for restoring the block to the original shape (SAT) is generated also in the block 70 (see the thick broken line arrows in FIG. 10).

In this manner, in the block 70 of the present embodiment, by forming the block 70 and the sipe 76 with shapes twisted in the same direction, it is possible for a stronger SAT to be generated.

Therefore, a clockwise SAT (see arrows in FIG. 1) generated due to the steel cords 19 provided parallel to each other in the outermost reinforcing layer can be suppressed (reduced) by a counterclockwise torque generated by the block 70 and the small blocks 70a to 70d.

It is preferable that, in the same manner as the first embodiment, a position P1 of the rotation axis Z in the plan view seen from the contact patch area 74 is within a range of $0.2 \text{ W} \leq \text{P1} \leq 0.8 \text{ W}$ from the side surface 20 toward the side surface 22 in the B direction. It is also preferable that a position P2 of the rotation axis Y in the side view seen from the side surface 71 is within a range of $0.2 \text{ F} \leq \text{P2} \leq 0.6 \text{ F}$ from the contact patch area 26 toward the bottom portion 30 in the C direction. By locating the rotation axis Z and the rotation axis Y within these ranges, stiffness of the small blocks 18a to 18d increases and leaning of the small blocks 18a to 18d can be prevented. Consequently, the performance on ice and snow improves even more.

As in the block 18 of the first embodiment, the size of the block 70 according to the present embodiment is a L (Length)×W (Width)×H (Height) of 30 mm×20 mm×10 mm (see FIG. 2). Moreover, the vertical depth F of the sipe from the contact patch area 74 is 8 mm. The twist angle $\theta 3$ of the block 70 around the rotation axis U is 5°.

Further, the sipes 76 are formed in positions where-at a side surface 82, 'a', which is the distance from an end surface of the block 70 in the A direction and also is the distance between the adjacent sipes, is 7 mm, and 'b', which is the distance to the other end surface, is 9 mm, while at an opposite side surface 84, 'b', the distance from the end surface of the block 70 in the A direction, is 9 mm, and 'a', the distance between the adjacent sipes and the distance to the other end surface, is 7 mm. The sipe 76 is shaped so that straight lines connect the both end surfaces. The twist angle $\theta 4$ of the sipe 76 is 11.4° and the twist angle $\theta 13$ is 28.1°.

Sixth Embodiment

Still further, a pneumatic tire relating to a sixth embodiment of the present invention will be described in accordance with FIG. 11. Since the only differences between the pneumatic tire of the first embodiment and that of the present embodiment are the block shape and the sipe shape, only blocks and sipes will be described. The same reference numerals are used to designate elements which are the same as those in the first embodiment, and detailed description thereof will be omitted.

Figure 11:
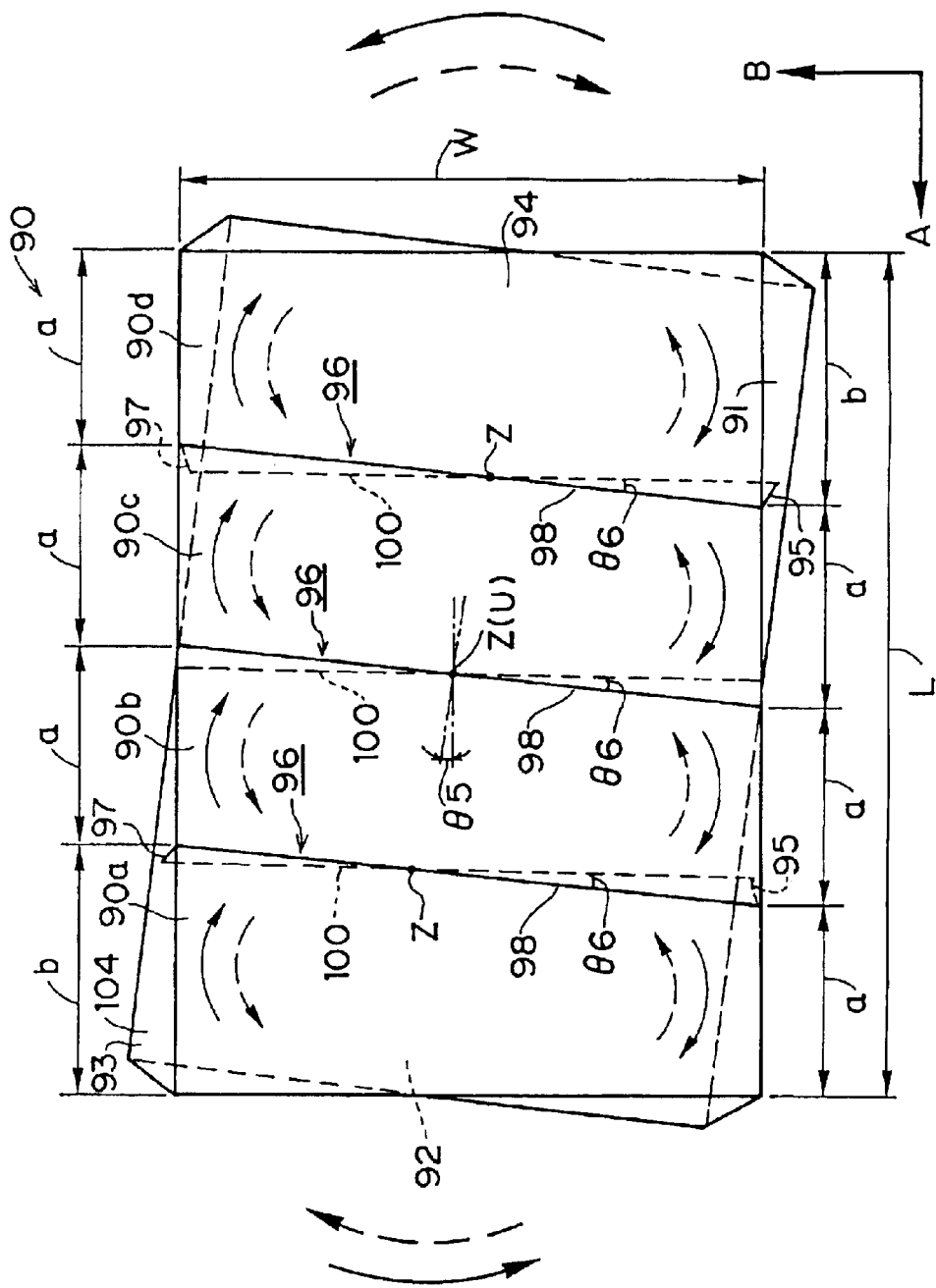
FIG. 11 is a plan view of a block relating to a sixth embodiment of the present invention.

A block 90 has a shape which is twisted at an angle θ5 from a bottom surface 92, which is located at the same height as the bottom of main groove 14 in the tread surface, toward a contact patch area 94 as shown in FIG. 11. That is, the block 90 is shaped so as to be twisted clockwise at an angle θ5 from the contact patch area 94 toward the bottom surface 92 around a rotation axis U perpendicular to the contact patch area 94.

A sipe 96 provided in the block 90 is also formed such that a surface portion 98, which is linear at the contact patch area 94, and a bottom portion 100, which is linear at the bottom of the sipe, cross in an X shape in a plan view seen from the contact patch area 94. That is, the sipe 96 also is shaped so as to be twisted counterclockwise, which is opposite to the rotational direction of the block 18, at an angle θ6 from the contact patch area 94 toward the bottom of the sipe around a rotation axis Z perpendicular to the contact patch area 94.

Further, the sipe 96 is formed such that a first side surface portion 95 which is linear at a side surface 91 and a second side surface portion 97 which is linear at a side surface 93 cross in an X shape in a side view seen from the side surface 91. That is, the sipe 96 is shaped so as to be twisted at an angle θ14 (not shown) from the first side surface portion 95 toward the second side surface portion 97 around a rotation axis Y (not shown) parallel to the contact patch area 94.

By driving a vehicle to which the pneumatic tires 10 formed in the above-described manner are mounted, effects such as the following are obtained.

That is, in the same manner as the first embodiment, since the sipe 96 is formed with a twist of an angle θ6, small blocks 90a to 90d strongly abut each other not only due to a force exerted from the A direction, but also due to forces from various directions exerted from the contact patch area 94 of the block 90.

Furthermore, since the sipe and the block are twisted in opposite directions, a torque of the opposite direction is exerted on the small blocks. Due to this, the adjacent small blocks abut each other extremely strongly.

Thus, leaning of the small blocks 90a to 90d is suppressed further, and the performance on ice and snow can be improved even more.

Moreover, in the same manner as the first embodiment, since the sipe 96 is shaped so as to be twisted at an angle θ6 around the rotation axis Z, the small blocks 90a to 90d rotate clockwise (see solid line arrows in FIG. 11) in the plan view seen from the contact patch area 94 due to ground contact pressure.

Due to this rotation, a counterclockwise torque for restoring the small block to the original shape (SAT) is generated in each of the small blocks 90a to 90d (see broken line arrows in FIG. 11).

At the same time, since the block 90 also is shaped so as to be twisted at an angle θ5 around the rotation axis U, the block 90 rotates counterclockwise in the plan view seen from the contact patch area 94 due to ground contact pressure (see the thick solid line arrows in FIG. 11).

Due to this rotation, a clockwise torque for restoring the block to the original shape (SAT) is generated in the block 90 as well.

Thus, the torque difference between the two torques is the SAT generated in the block 90.

Therefore, by providing the block 90 in an appropriate direction on the surface of the tread 12, the SAT generated due to the steel cords 19 provided parallel to each other in the outermost reinforcing layer (see the arrows in FIG. 1) can be suppressed (reduced) by the SAT generated by the block 90 and the SAT generated by the small blocks 90a to 90d.

It is preferable that, in the same manner as the first embodiment, a position P1 of the rotation axis Z in the plan view seen from the contact patch area 94 is within a range of $0.2\ W \leq P1 \leq 0.8\ W$ from the side surface 20 toward the side surface 22 in the B direction. It is also preferable that a position P2 of the rotation axis Y in the side view seen from the side surface 91 is within a range of $0.2\ F \leq P2 \leq 0.6\ F$ from the contact patch area 26 toward the bottom portion 30 in the C direction. By locating the rotation axis Z and the rotation axis Y within these ranges, stiffness of the small blocks 18a to 18d increases and leaning of the small blocks 18a to 18d can be prevented. Consequently, the performance on ice and snow improves even more.

In the same manner as the block 18 of the first embodiment, the size of the block 90 according to the present embodiment is a L (Length)×W (Width)×H (Height) of 30 mm×20 mm×10 mm (see FIG. 2). Moreover, the vertical depth F of the sipe from the contact patch area 94 is 8 mm. The twist angle θ5 of the block 90 around the rotation axis U is 5°.

The sipes 96 are formed in positions where in a side surface 102, 'a', which is the distance from an end surface of the block 90 in the A direction and also is the distance between the adjacent sipes, is 7 mm, and 'b', which is the distance to the other end surface, is 9 mm, while at an opposite side surface 104, 'b', the distance from the end surface of the block 90 in the A direction, is 9 mm, and 'a', the distance between the adjacent sipes and the distance to the other end surface, is 7 mm. The sipe 96 is shaped such that straight lines connect the both end surfaces. The twist angle θ6 of the sipe 96 is 11.4° and the twist angle θ14 is 28.1°.

Seventh Embodiment

Next, a pneumatic tire relating to a seventh embodiment of the present invention will be described in accordance with FIG. 12 and FIG. 13. Since the only difference between the pneumatic tire of the first embodiment and that of the present embodiment is the shape of sipes, only sipes will be described. The same reference numerals are used to designate elements which are the same as those in the first embodiment, and detailed description thereof will be omitted.

A sipe 110 formed in the block 18 is shaped so as to be a quadrangular closed loop in an AB-section, and continuously connects a quadrangular surface portion 112 at the contact patch area 26 and a quadrangular bottom portion 114, which has the same shape as the surface portion 112 and is located at a position rotated at an angle θ7 in a plan view seen from the contact patch area 26. That is, the sipe 110 is shaped so as to be twisted counterclockwise at an angle θ7 from the contact patch area 26 toward the bottom of the sipe around the rotation axis Z perpendicular to the contact patch area 26. The contact patch area 26 side of the block 18 is divided into an inner small block 18e and an outer small block 18f by the sipe 110.

By driving a vehicle to which the pneumatic tires 10 formed in the above-described manner are mounted, effects such as the following are obtained.

The block 18 is compressed in the C direction due to ground contact pressure and expands in the A direction and the B direction and accordingly, the small blocks 18e, 18f opposing across the sipe 110 abut each other. At this time, since the small block 18e is deformed further in the clockwise twist direction while guided by the sipe 110, the small block 18e abuts the small block 18f with a strong force.

Thus, leaning of the small blocks 18e, 18f is suppressed, and a contact patch area area on the contact patch area 26 increases, so that the performance on ice and snow of the pneumatic tire 10 improves.

Moreover, in the same manner as the first embodiment, since the sipe 110 is shaped so as to be twisted at an angle θ7 around the rotation axis Z, the small block 18e rotates clockwise (see the solid line arrows in FIG. 12) in the plan view seen from the contact patch area 26 due to ground contact pressure.

Figure 12:
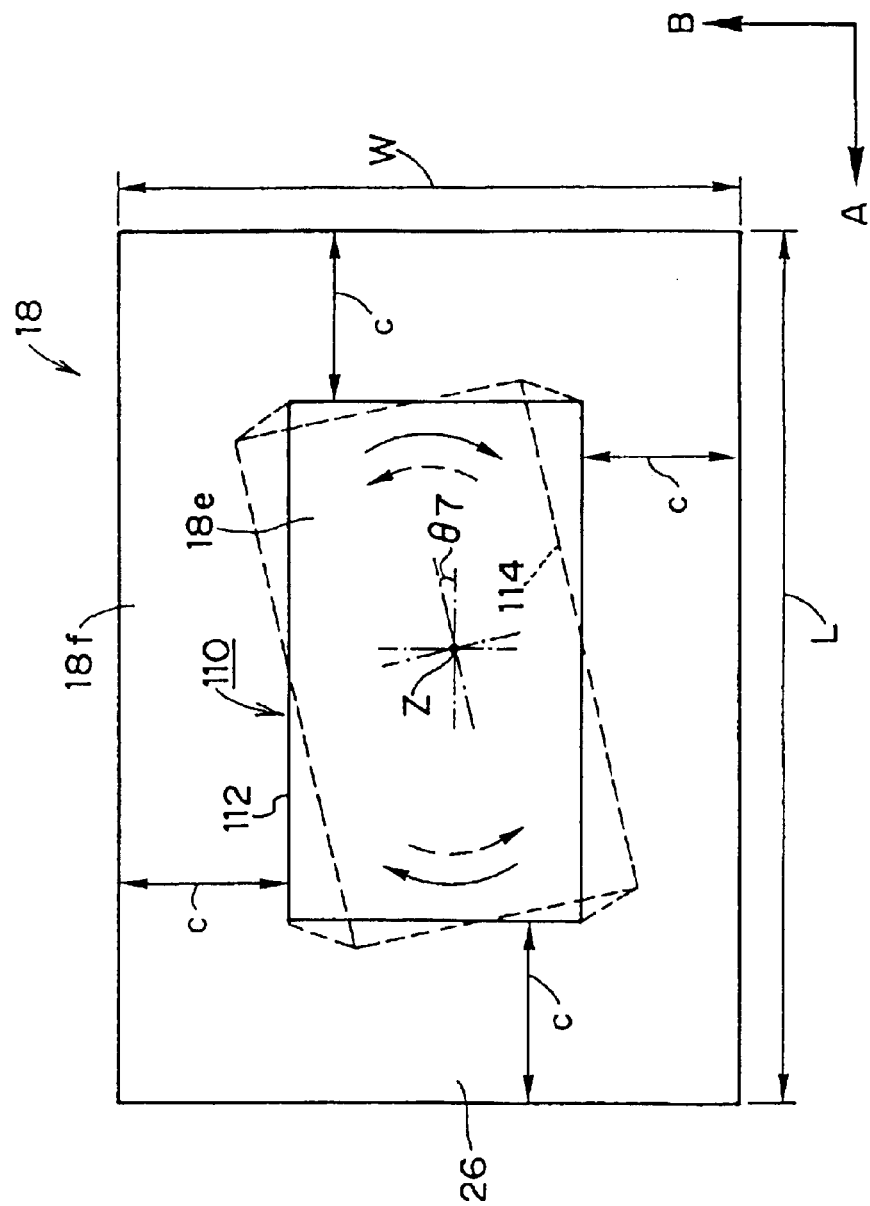
FIG. 12 is a plan view of a block relating to a seventh embodiment of the present invention.
Figure 13:
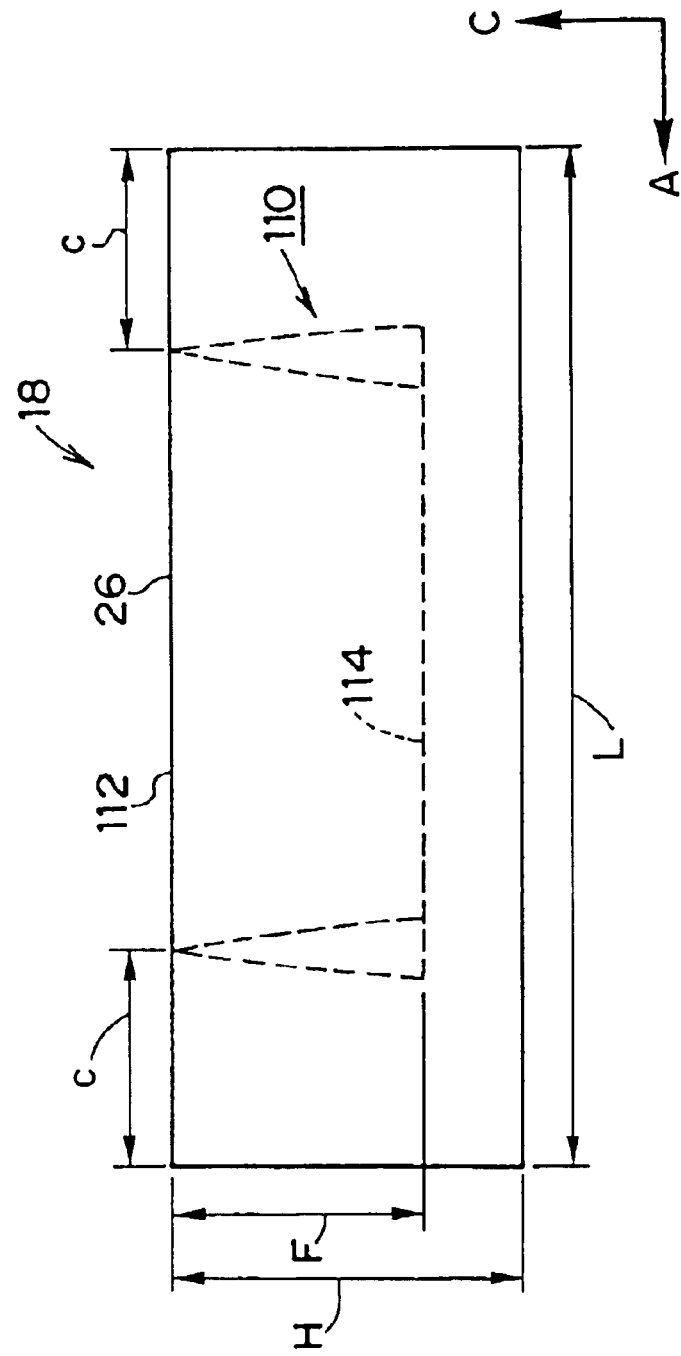
FIG. 13 is a side view of the block relating to the seventh embodiment of the present invention.

Due to this rotation, a counterclockwise torque for restoring the small block to the original shape (SAT) is generated in the small block 18e (see the broken line arrows in FIG. 12).

Therefore, a clockwise SAT (see arrows in FIG. 1) generated due to the steel cords 19 provided parallel to each other in the outermost reinforcing layer can be suppressed (reduced) by the counterclockwise SAT generated by the small block 18e.

As in the first embodiment, the size of the block 18 according to the present embodiment is a L (Length)×W (Width)×H (Height) of 30 mm×20 mm×10 mm. Moreover, the vertical depth F of the sipe from the contact patch area 26 is 8 mm.

The sipe 110 is formed at a position where in the contact patch area 26, 'c', which is the distance from an end surface in the A direction and also is the distance from an end surface in the B direction, is 6 mm. The twist angle θ7 of the sipe 10 is 5°.

Eighth Embodiment

Next, a pneumatic tire relating to an eighth embodiment of the present invention will be described in accordance with FIG. 14 and FIG. 15. Since the only differences between the pneumatic tire of the first embodiment and that of the present embodiment are the block shape and the sipe shape, only blocks and sipes will be described. The same reference numerals are used to designate elements which are the same as those in the seventh embodiment, and detailed description thereof will be omitted.

A block 120 is shaped so as to connect a bottom surface 122, which is located at the same height as the main groove in the tread surface, and a contact patch area 124 located at a position rotated at an angle θ8 from the bottom surface 122 in a plan view. That is, the block 120 is shaped so as to be twisted counterclockwise at an angle θ8 from the contact patch area 124 toward the bottom surface 122 around a rotation axis U perpendicular to the contact patch area 124.

A sipe 126, which is a quadrangular closed loop and is provided in the block 120, also is shaped such that a quadrangular surface portion 128 on the contact patch area 124 and a bottom portion 130 in the bottom of the sipe, which portion has a quadrangular shape identical to the surface portion 128, are located at positions rotated at an angle θ9 in a plan view seen from the contact patch area 124. That is, the sipe 126 has a shape which is twisted counterclockwise, the same direction as the block 120 twist direction, at an angle θ9 from the contact patch area 124 toward the bottom of the sipe around a rotation axis Z perpendicular to the contact patch area 124. While the angle θ8 and the angle θ9 are the same in the present embodiment, they may also be different.

The contact patch area 124 side of the block 120 is divided into an inner small block 120e and an outer small block 120f by the sipe 126. By driving a vehicle to which the pneumatic tires 10 formed in the above-described manner are mounted, effects such as the following are obtained.

The block 120 is compressed in the C direction due to ground contact pressure and expands in the A direction and the B direction, and accordingly, the small blocks 120e, 120f opposing across the sipe 126 abut each other.

Thus, leaning of the small blocks 120e, 120f is suppressed, and a contact patch area area on the contact patch area 124 increases, so that the performance on ice and snow of the pneumatic tire 10 improves.

Moreover, in the same manner as the first embodiment, since the sipe 126 is shaped so as to be twisted at an angle θ9 around the rotation axis Z, the small block 120e rotates clockwise (see solid line arrows in FIG. 14) in the plan view seen from the contact patch area 124 due to ground contact pressure.

Figure 14:
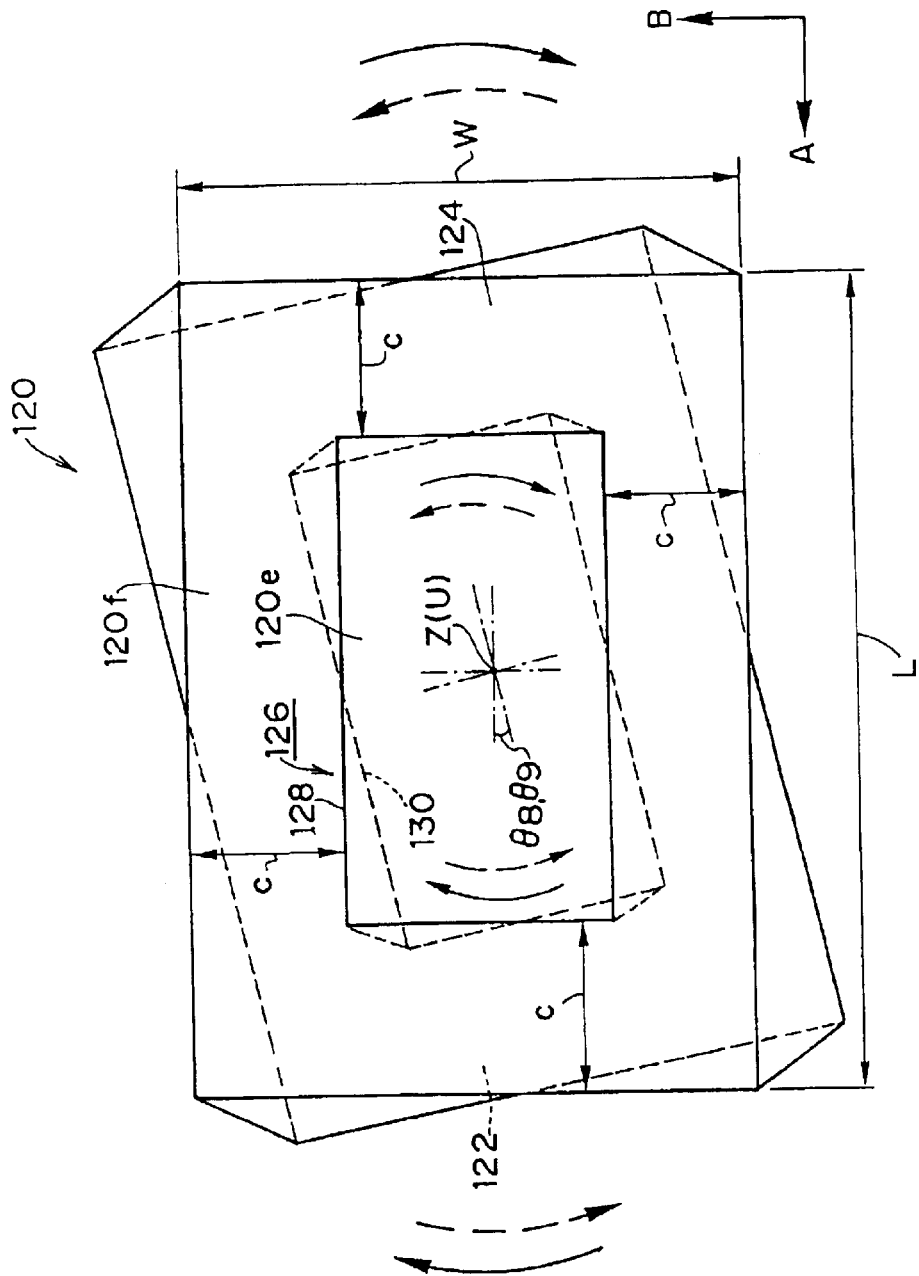
FIG. 14 is a plan view of a block relating to an eighth embodiment of the present invention.
Figure 15:
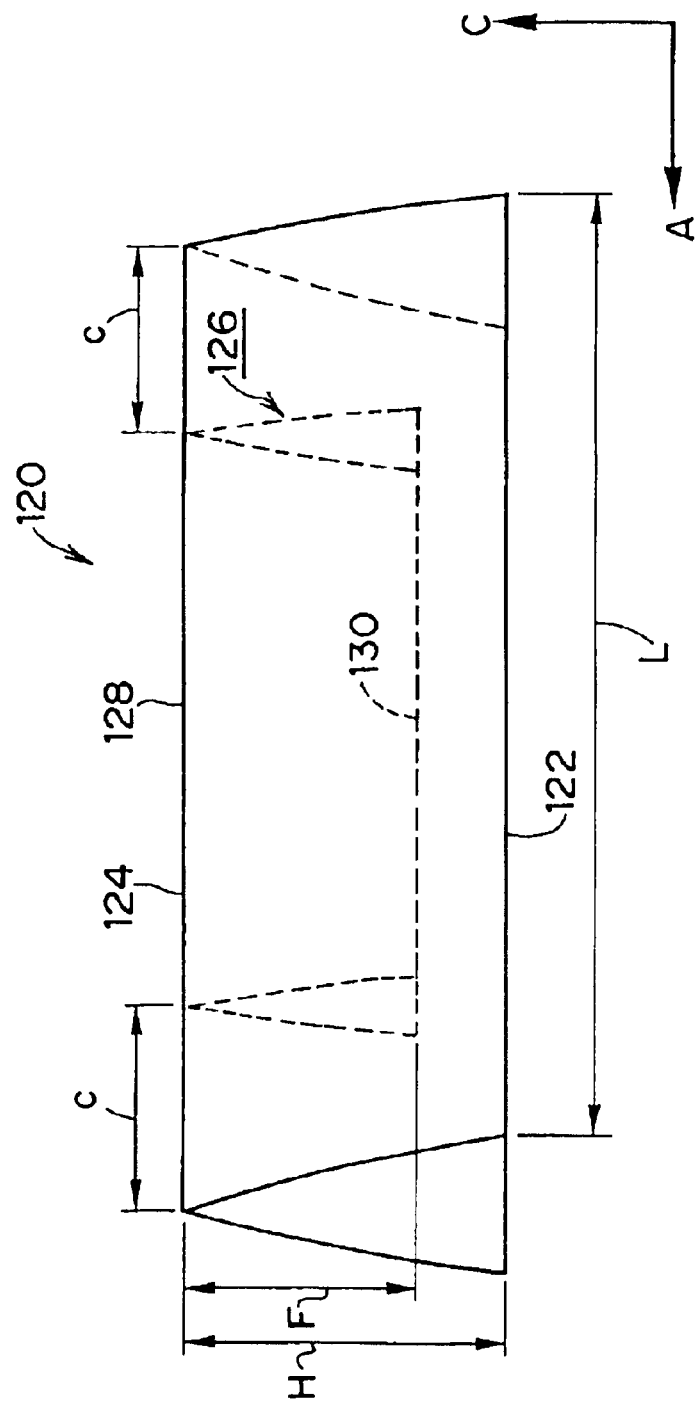
FIG. 15 is a side view of the block relating to the eighth embodiment of the present invention.

Due to this rotation, a counterclockwise torque for restoring the small block to the original shape (SAT) is generated in the small block 120e (see the broken line arrows in FIG. 14).

Further, as the block 120 is shaped so as to be twisted at an angle θ8 around the rotation axis U, the block 120 is rotated clockwise (see the thick solid line arrows in FIG. 14) in the plan view seen from the contact patch area 124 due to ground contact pressure.

Due to this rotation, a counterclockwise torque for restoring the block to the original shape (SAT) is generated in the block 120 (see the thick broken line arrows in FIG. 14).

In this manner, in the block 120, a stronger SAT is generated since the twist direction of the block 120 itself and the direction of the torque (SAT) generated by the twist of the sipe 126 are the same.

Therefore, a clockwise SAT (see the arrows in FIG. 1) generated due to the steel cords 19 provided parallel to each other in the outermost reinforcing layer can be suppressed (reduced) further by the counterclockwise SAT generated by the block 120.

As in the first embodiment, the size of the block 120 according to the present embodiment is a L (Length)×W (Width)×H (Height) of 30 mm×20 mm×10 mm. Moreover, the vertical depth F of the sipe 126 from the contact patch area 124 is 8 mm. The twist angle θ8 of the block 120 around the rotation axis U is 5°.

Further, at the contact patch area 124, 'c', which is the distance from an end surface of the block 120 in the A direction to the sipe 126 and also is the distance from an end surface of the block 120 in the B direction to the sipe 126, is 6 mm. The twist angle θ9 of the sipe 126 around the rotation axis Z is 5°.

Ninth Embodiment

Lastly, a pneumatic tire relating to a ninth embodiment of the present invention will be described in accordance with FIG. 16 and FIG. 17. Since the only differences between the pneumatic tire of the first embodiment and that of the present embodiment are the block shape and the sipe shape, only blocks and sipes will be described. The same reference numerals are used to designate elements which are the same as those in the seventh and eighth embodiments, and detailed description thereof will be omitted.

A block 140 is shaped so as to connect a bottom surface 142, which is located at the same height as the bottom of main groove 14 in the tread surface, and a contact patch area 144 located at a position rotated at an angle θ10 from the bottom surface 142 in a plan view. That is, the block 140 is shaped so as to be twisted counterclockwise at an angle θ10 from the contact patch area 144 toward the bottom surface 142 around the rotation axis U perpendicular to the contact patch area 144.

A sipe 146, which is a quadrangular closed loop and is provided in the block 140, also is shaped such that a bottom portion 150, which is the bottom of the sipe, is rotated at an angle θ11 with respect to a surface portion 148 of the contact patch area 144 from one another in a plan view seen from the contact patch area 144. That is, the sipe 146 has a shape which is twisted clockwise, i.e. in the opposite direction of the block 140 rotating direction, at an angle θ11 from the contact patch area 144 toward the bottom of the sipe around a rotation axis Z perpendicular to the contact patch area 144.

The contact patch area 144 side of the block 140 is divided into an inner small block 140e and an outer small block 140f by the sipe 146.

By driving a vehicle to which the pneumatic tires 10 formed in the above-described manner are mounted, effects such as the following are obtained.

The block 140 is compressed in the C direction due to ground contact pressure and expands in the A direction and the B direction. Accordingly, the small blocks 140e, 140f opposing across the sipe 146 abut each other. At this time, since the small block 140e tends to rotate counterclockwise due to ground contact pressure and the small block 140f tends to rotate clockwise due to the twisting of the block 140, the adjacent small blocks 140e, 140f abut each other across the sipe 146 with a greater strength.

Thus, leaning of the small blocks 140e, 140f is suppressed further, and a contact patch area area on the contact patch area 144 increases, so that the performance on ice and snow of the pneumatic tire 10 improves.

Moreover, in the same manner as the first embodiment, since the sipe 146 is shaped so as to be twisted at an angle θ11 around the rotation axis Z, the small block 140e rotates counterclockwise (see the solid line arrows in FIG. 16) in the plan view seen from the contact patch area 144 due to ground contact pressure.

Figure 16:
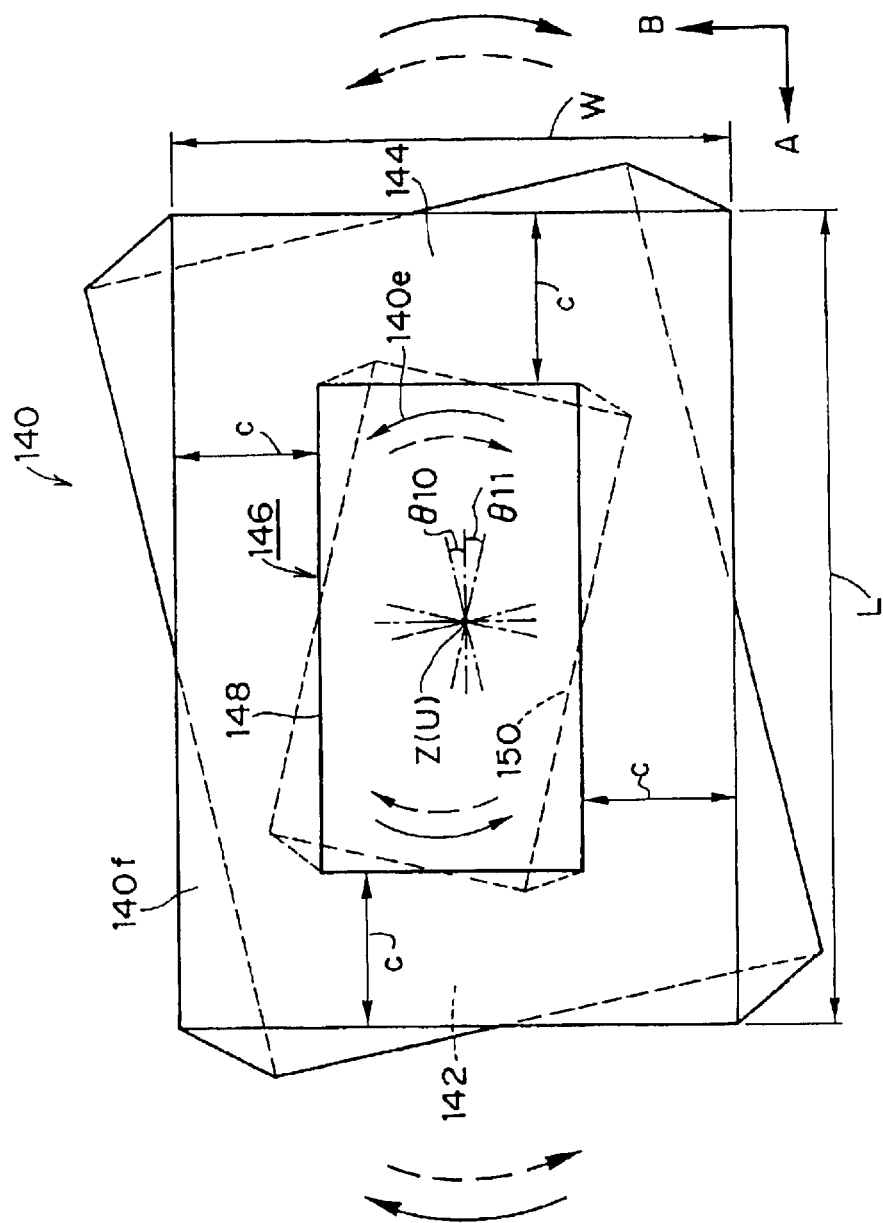
FIG. 16 is a plan view of a block relating to a ninth embodiment of the present invention.
Figure 17:
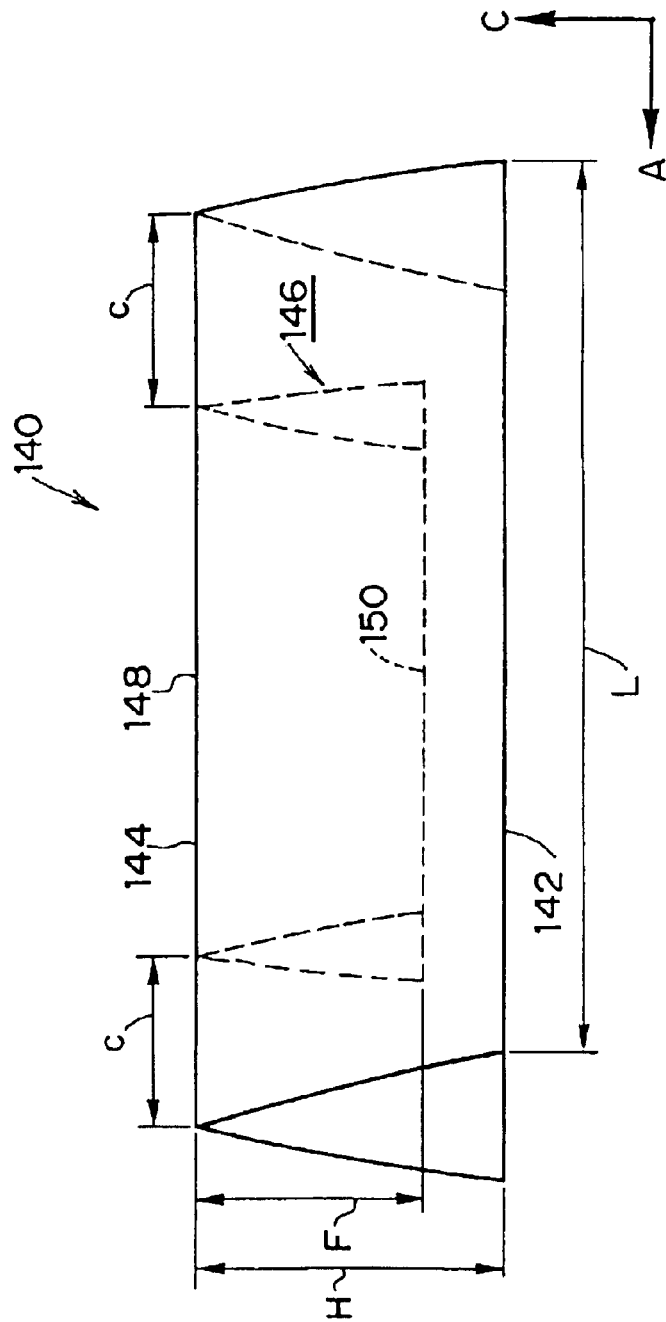
FIG. 17 is a side view of the block relating to the ninth embodiment of the present invention.

Due to this rotation, a clockwise torque for restoring the small block to the original shape (SAT) is generated in the small block 140e (see broken line arrows in FIG. 16).

On the other hand, the block 140 is shaped so as to be twisted at an angle θ10 around the rotation axis U and rotates clockwise (see the thick solid line arrows in FIG. 16) in the plan view seen from the contact patch area 144 due to ground contact pressure.

Due to this rotation, a counterclockwise torque for restoring the block to the original shape (SAT) is generated in the block 140 (see the thick broken line arrows in FIG. 16).

Thus, the torque (SAT) generated in the block 140 overall is the difference in torque generated by the twisting of the block 140 itself and that generated by the twisting of the sipe 146.

Therefore, by providing the block 140 in an appropriate direction on the surface of the tread 12, the SAT (see the arrows in FIG. 1) generated due to the steel cords 19 provided parallel to each other in the outermost reinforcing layer can be suppressed (reduced) by the SAT generated by the block 140.

As in the first embodiment, the size of the block 140 according to the present embodiment is a L (Length)×W (Width)×H (Height) of 30 mm×20 mm×10 mm. The vertical depth F of the sipe from the contact patch area 144 is 8 mm. The twist angle θ10 of the block 140 around the rotation axis U is 5°.

Moreover, the sipe 146 is formed in a position where in the contact patch area 144, 'c', which is the distance from an end surface of the block 140 in the A direction and also is the distance from an end surface of the block 140 in the B direction, is 6 mm. The twist angle θ11 of the sipe 146 around the rotation axis Z is 5°.

The angle θ10 and the angle θ11 may be the same or different.

Test Examples

Next, an SAT test and a block deformation amount test carried out by using sample blocks, and an on-ice performance test carried out by using real tires will be described in accordance with FIGS. 18 through 25.

First, the SAT test will be described. A sample block corresponds to a block of a pneumatic tire. Examples 1 to 9 correspond to the block of the first to ninth embodiments, respectively.

Figure 18:
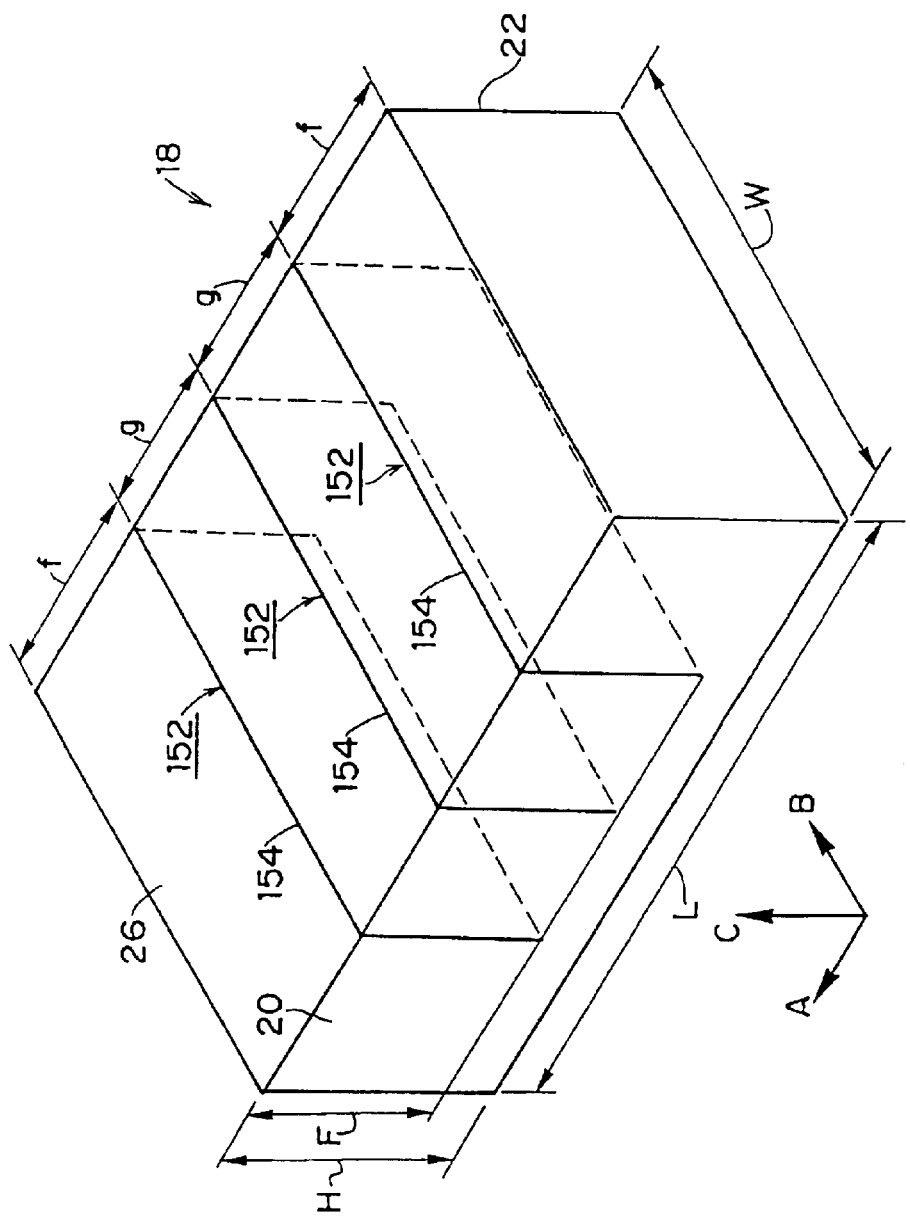
FIG. 18 is a perspective view of a block relating to Comparative Example 1.

As shown in FIG. 18, in the block 18 of Comparative Example 1, sipes 152, which are of the type which opens on both sides and have a sipe depth direction formed linear and parallel to the C direction, are provided. As in the block 18 of the first embodiment, the size of the block 18 is a L (Length)×W (Width)×H (Height) of 30 mm×20 mm×10 mm. The vertical depth F of the sipe 152 from the contact patch area 26 is 8 mm. Surface portions 154 are formed in positions where at the side surfaces 20, 22, a distance 'f' from an end surface of the block 18 in the A direction is 8 mm and a distance 'g' between the adjacent sipes is 7 mm.

Figure 19:
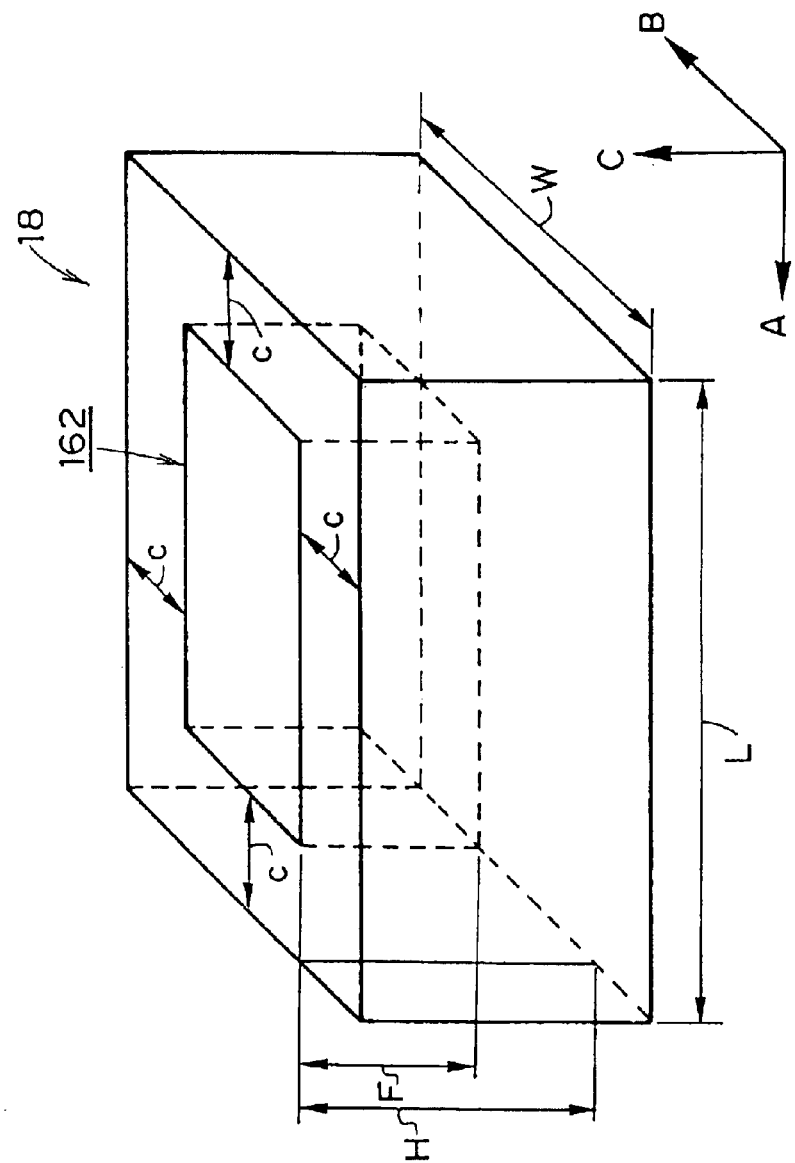
FIG. 19 is a perspective view of a block relating to Comparative Example 2.

Moreover, as shown in FIG. 19, Comparative Example 2 employs the block 18 in which a sipe 162 with a quadrangular closed loop is formed. As in the block 18 of the seventh embodiment, the size is a L (Length)×W (Width)×H (Height) of 30 mm×20 mm×10 mm. The vertical depth F of the sipe from the contact patch area 26 is 8 mm. The sipe 162 is provided in a position where at the contact patch area 26, 'c', which is the distance from an end surface of the block 18 in the A direction and also is the distance from an end surface of the block 18 in the B direction, is 6 mm.

Neither the block of Comparative Example 1 nor the block of Comparative Example 2 have a twisted portion.

The blocks of Examples 1 to 9 and of Comparative Examples 1, 2 formed in the above-described manner were pressed vertically against the road surface, and the SATs at the time when the blocks were compressed to 10% of the block height are listed. The test results are shown in FIG. 20 where the unit is kgf·m. In the diagram, counterclockwise rotation in a plan view seen from the contact patch area is expressed by '+', and clockwise rotation by '−'.

By comparing Examples 1 to 6 with Comparative Example 1, it becomes clear that since the sipes are twisted, the small blocks rotate due to ground contact pressure, thereby generating the SAT. In Examples 1 to 4, the effect of providing recessed and protruding portions having a triangular section on the sipes is slight, and it is evident that twists greatly affect the SAT.

By comparing Example 5 with Example 6 in both of which twists are applied to the sipes and the blocks, it becomes evident that in Example 5, in which the sipes and the blocks are twisted in the same direction, a SAT larger in absolute value than that in Example 6 in which the sipes and the blocks are twisted in opposite directions is generated.

By comparing Examples 7 to 9 with Comparative Example 2, it becomes clear that since the sipes are twisted, the small blocks rotate due to ground contact pressure, thereby generating the SAT. In particular, comparing Examples 8 and 9 in both of which twists are applied to the blocks as well, it is evident that in Example 8, in which twists of the same direction are applied to the sipes and the blocks, an extremely large SAT is generated.

Next, a test for examining deformation amount was carried out by using the same sample blocks. Deformation amount in the A direction of the sample block at its contact patch area end portion was examined in a state in which the block was pressed against ice with a load of 2.2 kgf/cm$^2$, and the ice was moved relative to the sample block at 20 km/h. The test results are shown in FIG. 21 where the unit is mm.

By comparing Examples 1 to 6 with Comparative Example 1, it becomes clear that since the sipes are twisted, the small blocks rotate due to ground contact pressure and strongly abut each other, thereby suppressing leaning (the deformation amount) of the small blocks. Among Examples 1 to 4, in Examples 2 to 4, in which recessed and protruding portions having a triangular section are provided in the sipes, the deformation amount is further suppressed, and in particular, Examples 3 and 4, in which the sipes are formed so as to fit together due to rotational deformation of the small blocks, leaning (the deformation amount) of the small blocks is further suppressed.

Moreover, of Examples 5 and 6, in which twists were applied to the blocks as well, in Example 6, in which twists in directions opposite to each other were applied to the sipes and the blocks respectively, torque of opposite directions act on the small blocks causing them to strongly abut each other, and thus, leaning (deformation amount) was suppressed further.

By comparing Examples 7 to 9 with Comparative Example 2, it becomes clear that since the sipes are twisted, the small blocks rotate due to ground contact pressure and abut each other, thereby suppressing leaning (the deformation amount) of the small blocks. In particular, of Examples 8 and 9 in which twists are applied to the blocks as well, it was confirmed that in Example 9, in which twists of opposite directions are applied on the sipes and the blocks respectively, the small blocks abut each other, and thus leaning (deformation amount) of the small blocks is suppressed even more.

The on-ice brake performance test was then carried out by mounting pneumatic tires to an actual vehicle. The size of the tire was 185/70R14. The tires of Examples 1 to 9 and of Comparative Examples 1 and 2 used in the series of tests are pneumatic tires on whose tread surface, blocks having the same shape as the sample blocks of Examples 1 to 9 and of Comparative Examples 1 and 2 are formed respectively.

The on-ice brake test was carried out in a state in which the tires were mounted to a vehicle and the braking distance was then measured by suddenly applying the brakes while the vehicle was being driven at 20 km/h on an icy road. The test results express an on-ice brake performance by using the reciprocal of the braking distance as an index. The results indicate that the larger the index, the better the on-ice brake performance. The test results are shown in FIG. 22 where the on-ice brake performance of Comparative Example 1 is 100.

It was confirmed that Examples 1 to 9 also show better on-ice brake performances compared to the Comparative Examples.

Next, the relationship between the twist angle and the deformation amount was examined in the block 70 of the fifth embodiment by making the twist angle θ3 of the block and the twist angle θ4 of the sipe equal and by using several sample blocks in which the angle θ3 (=θ4) was changed. The results are shown by a graph in FIG. 23.

Figure 23:
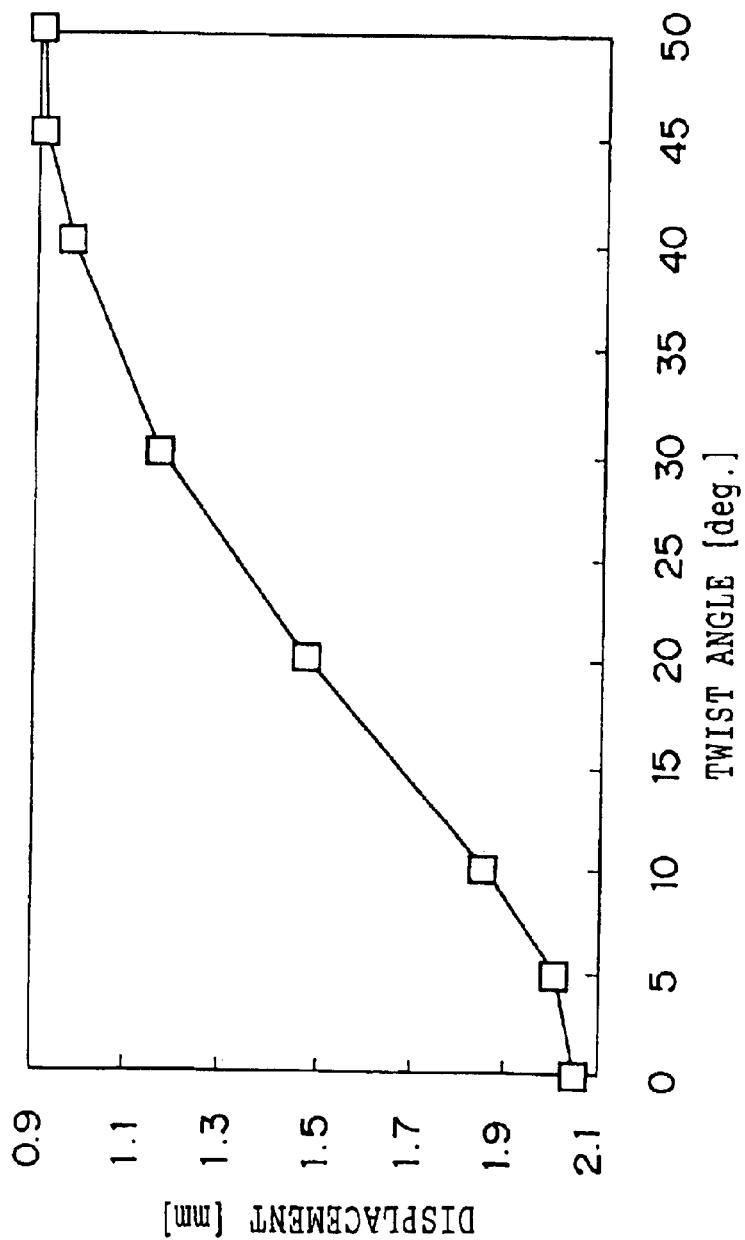
FIG. 23 is a graph showing the relationship between twist angle and displacement amount.

Basically, as shown in FIG. 23, the larger the angles θ3, θ4 become, the lower the displacement amount becomes. That is, leaning of the blocks can be suppressed further as the twist angles θ3, θ4 increase. However, if the twist angle is too large when the block is pulled out from the mold in a manufacturing process, the block will be broken off. Due to this limitation on manufacturing, it is preferable that the twist angles θ3, θ4 of the block and the sipe are 0°<θ3(=θ4)≦50°.

Further, the relationship between the location of the rotation axis Z, which is equivalent to a first central axis of twisting, and stiffness of the small blocks was tested.

The sample blocks were substantially the same as that of the first embodiment shown in FIG. 2 and several sample blocks were prepared in which the rotation axis Z is placed in different positions in the direction indicated by arrow B. That is, the change in displacement amount in the A direction of the small blocks 18a to 18d with respect to the rotation axis Z was examined. The test was carried out to examine the displacement amount in the A direction of the sample block at its contact patch area end portion in a state in which the block was pressed against ice with a load of 2.2 kgf/cm$^2$, and the ice was then moved relative to the sample block at 20 km/h.

Figure 24:
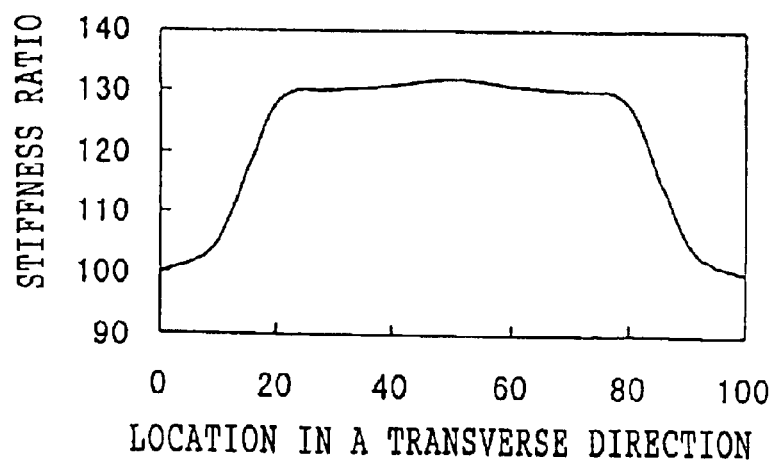
FIG. 24 is a graph showing the relationship between location of a rotation axis and stiffness of a small block.

The test results are shown in FIG. 24. The axis of abscissas indicates locations of the rotation axis Z in the B direction at the block 18 and the numbers indicate the percentage of the distance from the side surface 20 relative to the width W. The axis of ordinates indicates stiffness ratios in the case in which the reciprocal of the displacement amount in the A direction of the small block when the rotation axis Z is located on the side surface 20 is expressed as 100.

It was confirmed that, as shown in FIG. 24, stiffness of the small block further increases when the position (P1) of the rotation axis Z is within the range of 20 percent and 80 percent of the width W (0.2 W≦P1≦0.8 W), thus preventing leaning further.

Next, the relationship between the location of the rotation axis Y, which is equivalent to a second central axis of twisting, and stiffness of the small blocks was examined.

The sample blocks were substantially the same as that of the first embodiment shown in FIG. 2 and several sample blocks were prepared in which the rotation axis Y is placed in different positions in the direction indicated by arrow C. That is, the change in displacement amount in the A direction of the small blocks 18a to 18d with respect to the rotation axis Y was examined. The test was carried out by examining the displacement amount in the A direction of the sample block at the contact patch area end portion thereof in a state in which the block was pressed against ice with a load of 2.2 kgf/cm$^2$, and the ice was then moved relative to the sample block at 20 km/h.

Figure 25:
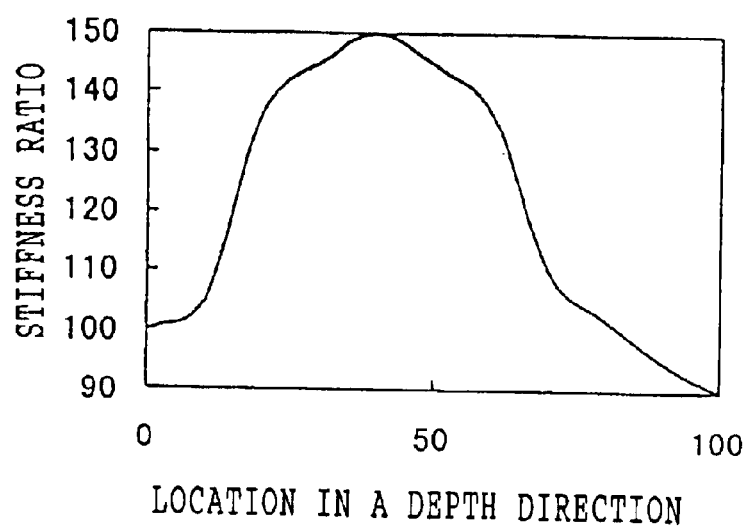
FIG. 25 is a graph showing the relationship between location of a rotation axis and stiffness of a small block.

The test results are shown in FIG. 25. The axis of abscissas indicates locations of the rotation axis Z in the C direction in the block 18 and the numbers indicate the percentage of the distance from the contact patch area 26 relative to the vertical depth F of the sipe 24. The axis of ordinates indicates stiffness ratios in the case in which the reciprocal of displacement amount of the small block in the A direction when the rotation axis Y is located on the contact patch area 26 is expressed as 100.

It was confirmed that, as shown in FIG. 25, stiffness of the small block further increases when the position (P2) of the rotation axis Y is within the range of 20 percent and 60 percent of the vertical depth F (0.2 F≦P2 ≦0.6 F ), thus preventing leaning further.

In the two above-described tests, only the results of tests carried out on the sample blocks substantially similar to that of the first embodiment are listed. In addition, the same two tests were also carried out on sample blocks substantially similar to those of the second to sixth embodiments, and similar test results were obtained.

Industrial Applicability

As described above, the pneumatic tire according to the present invention is suitable for use as a tire for running on icy and snowy roads and wet roads.

What is claimed is:

1. A pneumatic tire comprising:
a plurality of reinforcing layers in each of which cords, which are inclined at a predetermined angle with respect to a tire circumferential direction, are provided parallel to each other;
a tread provided on a top of said reinforcing layers which are laminated; and
a block-shaped land portion having a sipe, said block-shaped land portion being defined on a tread surface by main grooves formed in the tire circumferential direction and by lug grooves formed in a direction intersecting with the main grooves;
wherein said sipe is shaped so as to be twisted around a first central axis of twisting extending in a tire radial direction in the block shaped land portion and a second central axis of twisting extending substantially in a tire transverse direction, a position P1 of said first central axis of twisting in a region between one end surface of the block-shaped land portion and another end surface in the tire transverse direction and a position P2 of said central axis of twisting in a region between a contact patch area and a bottom of the sipe in the tire radial direction being within ranges satisfying the following expressions:

$$0.2\ W \leq P1 \leq 0.8\ W$$

$$0.2\ F \leq P2 \leq 0.6\ F$$

wherein P1, P2 represent the position of the first and second central axes of twisting; W represents a distance from one end surface to the other end surface of the block-shaped land portion in the tire transverse direction; and F represents a distance from the contact patch area to the bottom of the sipe in the tire radial direction;
wherein the sipe is twisted such that a self alignment torque is generated by the block so as to reduce a self alignment torque generated due to the cords provided parallel to each other in an outermost reinforcing layer of the plurality of reinforcing layers;
wherein the block-shaped land portion is twisted from the contact patch area toward the bottom portion, and
wherein a direction of twisting of the block shaped land portion is opposite to a direction of twisting of the sipe from the contact patch area toward the bottom of the sipe.

2. A pneumatic tire comprising:
a plurality of reinforcing layers in each of which cords, which are inclined at a predetermined angle with respect to a tire circumferential direction, are provided parallel to each other;
a tread provided on a top of said reinforcing layers which are laminated; and
a block-shaped land portion having a sipe, said block-shaped land portion being defined on a tread surface by main grooves formed in the tire circumferential direction and by lug grooves formed in a direction intersecting with the main grooves;
wherein said sipe is shaped so as to have a first protruding portion protruding in a first direction with respect to a virtual central plane and a second protruding portion protruding in a second direction opposite the first direction across the virtual central plane, said sipe including a surface portion exposed on a contact patch area of said block-shaped land portion and a bottom portion formed in a bottom of the sipe, the virtual central plane and thereby said sipe being twisted from the surface portion toward the bottom portion;
wherein the sipe is twisted such that a self alignment torque is generated by the block so as to reduce a self alignment torque generated due to the cords provided parallel to each other in an outermost reinforcing layer of the plurality of reinforcing layers;
wherein the block-shaped land portion is twisted from the contact patch area toward the bottom portion, and
wherein a direction of twisting of the block shaped land portion is opposite to a direction of twisting of the sipe from the contact patch area toward the bottom of the sipe.

3. A pneumatic tire according to claim 2, wherein said sipe is wave-shaped in a section parallel to the contact patch area of the block-shaped land portion.

4. A pneumatic tire according to claim 2, wherein said sipe is wave-shaped in a tire circumferential directional section of the block-shaped land portion.

5. A pneumatic tire according to claim 2, wherein said virtual central plane and thereby said sipe is shaped so as to be twisted around a first central axis of twisting extending in the tire radial direction in said block-shaped land portion, a position P1 of said first central axis of twisting in a region between one end surface of the block-shaped and portion and the other end surface in the tire transverse direction being within a range satisfying the following relational expression:

$$0.2\ W \leq P1 \leq 0.8\ W$$

wherein P1 represents the position of the first central axis of twisting; and W represents a distance from one end surface to the other end surface of the block-shaped land portion in the tire transverse direction.

6. A pneumatic tire according to claim 2, wherein said virtual central plane and thereby said sipe is shaped so as to be twisted around a second central axis of twisting extending substantially in the tire transverse direction in said block-shaped land portion, a position P2 of said second central axis of twisting in a region between the contact patch area and the bottom of the sipe in the tire radial direction being within a range satisfying the following relational expression:

$$0.2\ F \leq P2 \leq 0.6\ F$$

wherein P2 represents the position of the second central axis of twisting; and F represents a distance from the contact patch area to the bottom of the sipe in the tire radial direction.

7. A pneumatic tire comprising:

a plurality of reinforcing layers in each of which cords, which are inclined at a predetermined angle with respect to a tire circumferential direction, are provided parallel to each other;

a tread provided on a top of said reinforcing layers which are laminated; and a block-shaped land portion having a sipe, said block-shaped land portion being defined on a tread surface by main grooves formed in the tire circumferential direction and by lug grooves formed in a direction intersecting with the main grooves;

wherein said sipe is shaped as a closed loop which is connected with neither said main groove nor said lug groove, said sipe including a surface portion exposed on a contact patch area of the block shaped land portion and a bottom portion formed in a bottom of a sipe, the sipe being twisted from said surface portion toward said bottom portion;

wherein the sipe is twisted such that a self alignment torque is generated by the block so as to reduce a self alignment torque generated due to the cords provided parallel to each other in an outermost reinforcing layer of the plurality of reinforcing layers;

wherein the block-shaped land portion is twisted from the contact patch area toward the bottom portion, and wherein a direction of twisting of the block shaped land portion is opposite to a direction of twisting of the sipe from the contact patch area toward the bottom of the sipe.

* * * * *